(12) United States Patent
Schlosser et al.

(10) Patent No.: US 7,513,514 B1
(45) Date of Patent: Apr. 7, 2009

(54) ADJUSTABLE BALL JOINT CONNECTION ASSEMBLY

(75) Inventors: Richard D. Schlosser, Johnstown, CO (US); James A. Bloemen, Longmont, CO (US)

(73) Assignee: Niwot Corporation, Longmont, CO (US)

( * ) Notice: Subject to any disclaimer, the term of this patent is extended or adjusted under 35 U.S.C. 154(b) by 337 days.

(21) Appl. No.: 11/264,726

(22) Filed: Oct. 31, 2005

Related U.S. Application Data

(60) Provisional application No. 60/623,516, filed on Oct. 29, 2004.

(51) Int. Cl.
*B62D 7/20* (2006.01)
(52) U.S. Cl. .............. 280/93.511; 280/86.756; 280/86.757; 280/86.751
(58) Field of Classification Search ............ 280/86.756, 280/86.757, 86.75, 86.751, 93.511
See application file for complete search history.

(56) References Cited

U.S. PATENT DOCUMENTS

| | | | |
|---|---|---|---|
| 3,526,413 A | 9/1970 | Muller | |
| 4,372,575 A | 2/1983 | Hyma | |
| 4,695,073 A | 9/1987 | Pettibone et al. | |
| 4,863,187 A | 9/1989 | Artz | |
| 4,921,271 A | 5/1990 | Berry et al. | |
| 4,946,188 A | 8/1990 | Key et al. | |
| D315,706 S | 3/1991 | Berry et al. | |
| 5,697,632 A | 12/1997 | Burman et al. | |
| 6,224,075 B1 | 5/2001 | McIntyre | |
| 6,328,321 B1 | 12/2001 | Nolan | |
| 6,431,565 B2 * | 8/2002 | McIntyre | ............... 280/86.751 |
| 6,478,318 B1 | 11/2002 | Allman et al. | |
| 6,485,038 B1 | 11/2002 | Garrard | |
| 6,557,872 B1 | 5/2003 | Garrard | |
| 6,676,142 B2 | 1/2004 | Allman et al. | |
| 7,278,648 B2 * | 10/2007 | Bobbitt et al. | ......... 280/86.751 |

OTHER PUBLICATIONS

Wheel Alignment Specifications, copyright 2004, p. 207, Item #58, Nass Publishing Company, U.S., 1 page.

Product Insert for SPC Part 62030 Adjustable Upper Control Arm, product insert copyright 1999 but product sold since mid 1990s, Specialty Products Company, U.S., 1 page.

Photographs depicting an adjustable ball joint assembly sold by Specialty Products Company, sold in the U.S. since at least as early as mid-1999, 17 pages.

Performance Alignment Parts & Tools product brochure, 1999, Specialty Products Company, distributed at least in U.S., 6 pages.

(Continued)

*Primary Examiner*—John Q. Nguyen
*Assistant Examiner*—Nicole Verley
(74) *Attorney, Agent, or Firm*—Dorsey & Whitney LLP

(57) ABSTRACT

The present invention includes a ball joint assembly having a first stud extending upward from a ball joint housing and a second stud extending from the ball joint housing opposite the first stud. The ball joint assembly is adapted to adjustably connect with a control arm through a slotted connection. The rotational position of the second stud of the ball joint assembly relative to the control arm as well as the linear position of the first stud of the ball joint assembly within the slot can be adjusted to affect the camber and/or caster angles for wheel alignment on motor vehicles.

14 Claims, 22 Drawing Sheets

OTHER PUBLICATIONS

Product Flyer for SPC Parts 62010, 62030, 67120 and 67140 (Extreme SPC Performance—XR™ Line), copyright 2000, Specialty Products Company, U.S., 2 pages.

Mechanical drawings (9 pages) for Ball Joint design for SPC Part 67120, produced and sold in U.S. since at least as early as Jun. 29, 2000, 9 pages.

Photographs depicting an adjustable ball joint assembly (SPC Part 67330 ($2^{nd}$ generation)) sold by Specialty Products Company in the U.S. since at least as early as 2001, 12 pages.

Photographs depicting an adjustable ball joint assembly (SPC Part 67125 ($3^{rd}$ generation)) sold by Specialty Products Company in the U.S. since at least as early as 2001, 12 pages.

Installation Instructions for Ingalls Part 3555, copyright 1999, Ingalls Engineering Co., Inc., 2 pages.

Installation Instructions for Ingalls Part 3555/3556 ($2^{nd}$ generation), copyright 2001, Ingalls Engineering Co., Inc., 2 pages.

Product flyer for Ingalls Adjustable Ball Joints, distributed at U.S. trade show 2003, 1 page.

Stempf 1998-99 Wheel Alignment Product & Tool Catalog No. 150-298, 45, distributed at least in U.S. since 1998, 2 pages.

Product insert and instructions for K-MAC Camber and Caster Part 331116, date unknown, 1 page.

SPC Performance Suspension Tuning Alignment Parts brochure, copyright 2004, distributed at least in U.S., 12 pages.

Photographs depicting an adjustable ball joint assembly (Skunk 2 control arm and sliding ball joint with studs in a guide) sold by a competitor, since at least as early as 1998, 17 pages.

Ingalls Wheel Alignment Products, p. 32, 2002, distributed at trade shows or to product distributors in U.S., 2 pages.

Ingalls Wheel Alignment Products, Performance Suspension Components, distributed at trade shows or to product distributors in U.S. at least as early as 2003, 2 pages.

Ingalls Wheel Alignment Products, Performance Suspension Components, p. 132, copyright 2002, distributed at trade shows or to product distributors in U.S., 2 pages.

Ingalls 2001 Sport Component Car Alignment Products, Honda and Acura Kits, distributed at trade shows or to product distributors in U.S., 2 pages.

* cited by examiner

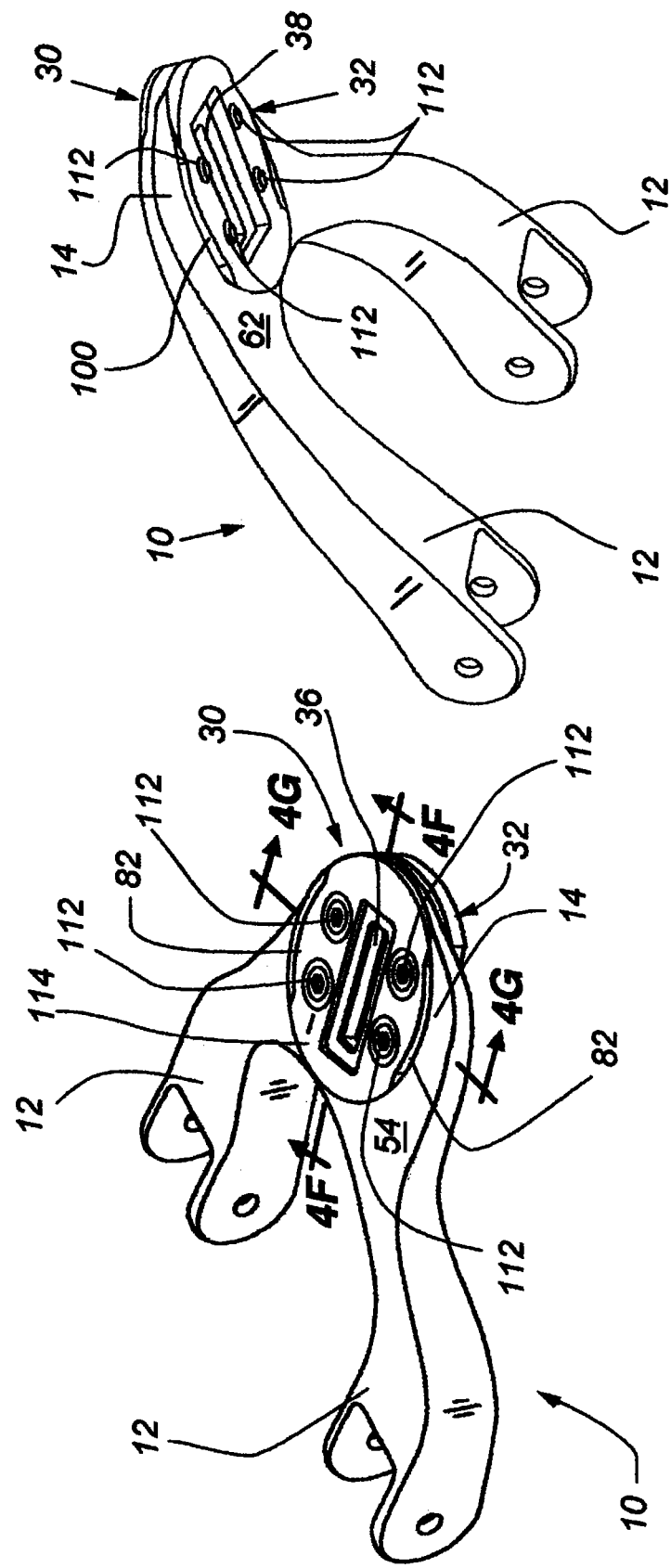

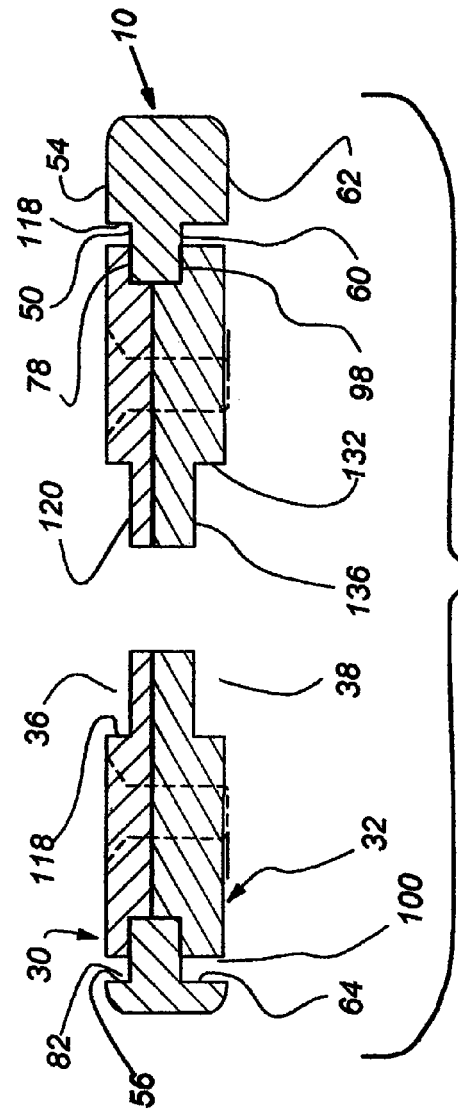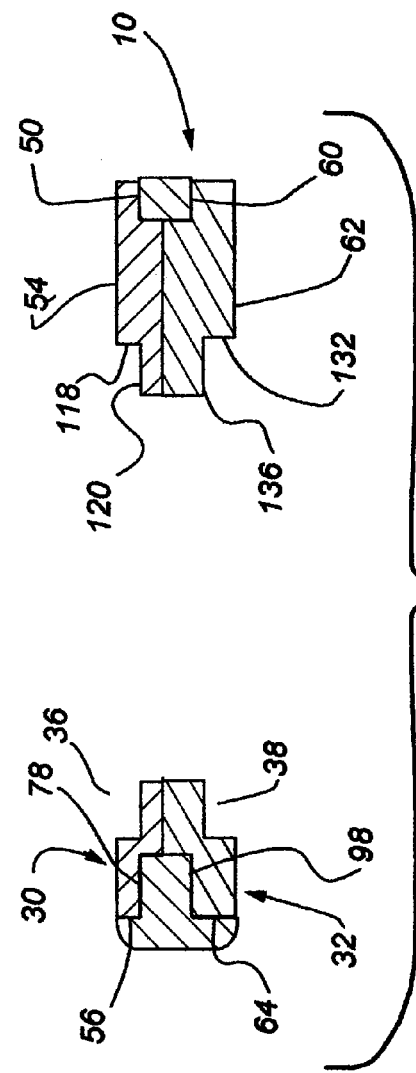

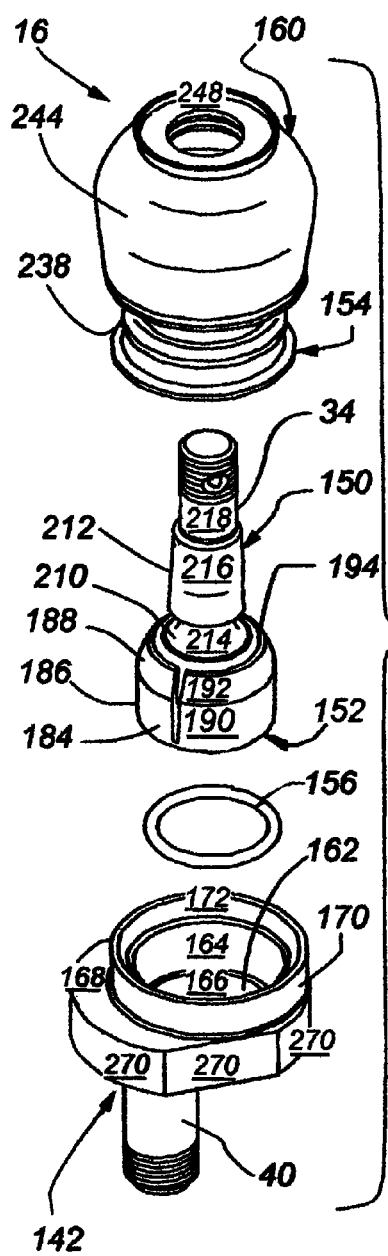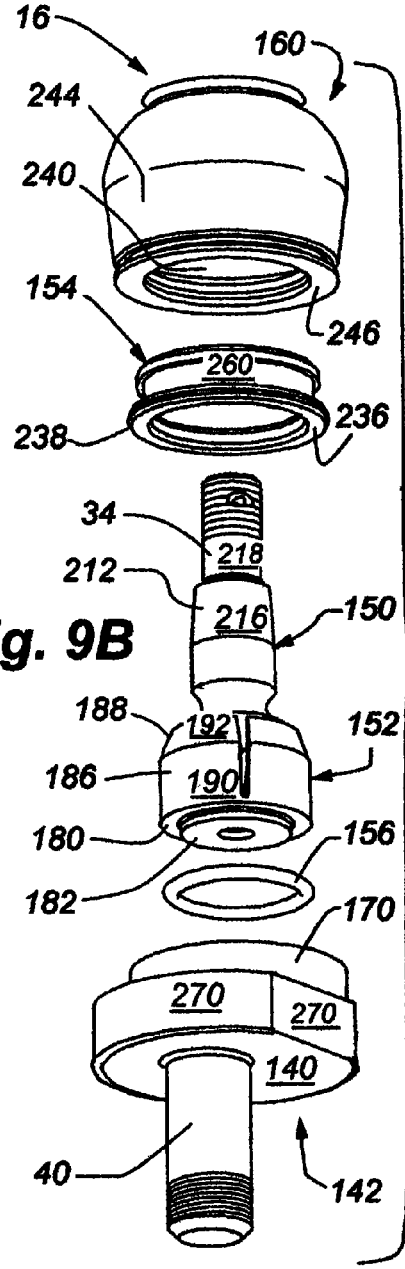

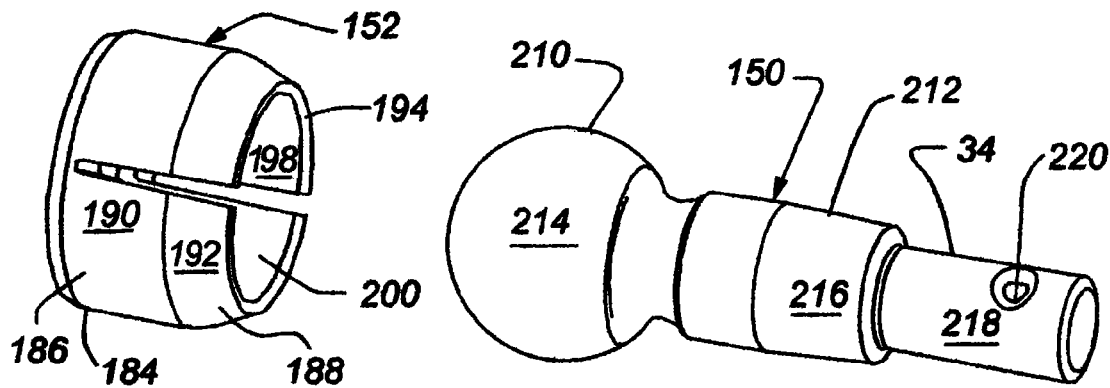
Fig. 10
Fig. 11
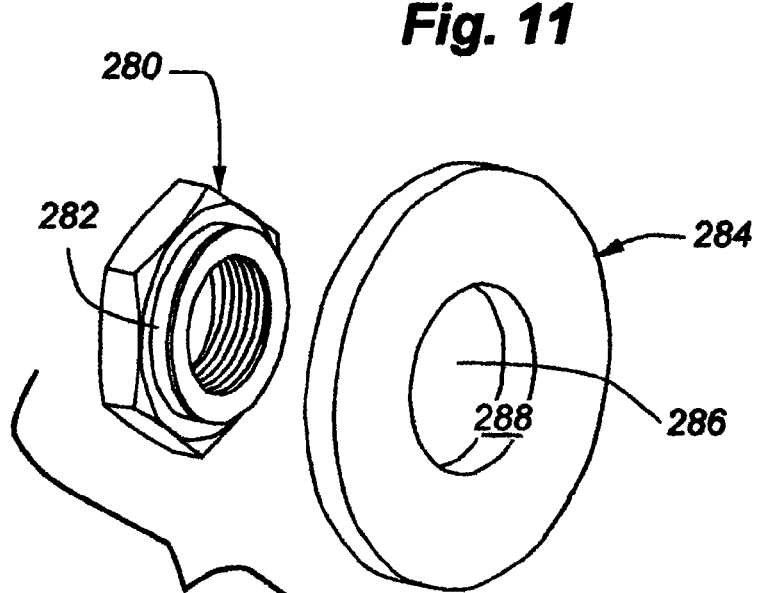
Fig. 12A
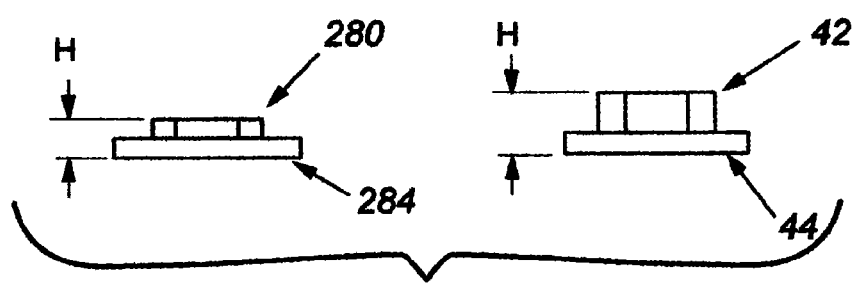
Fig. 12B

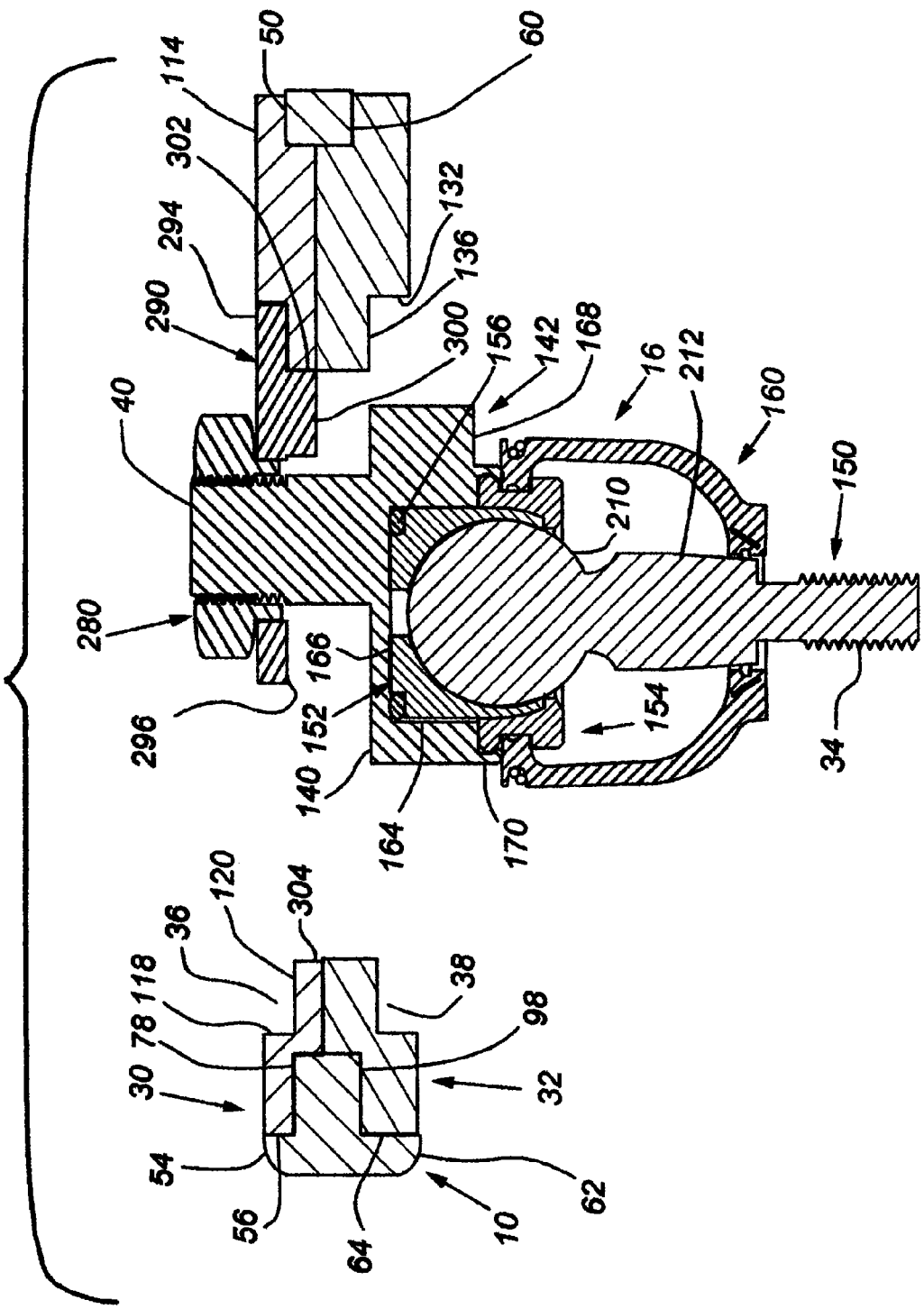

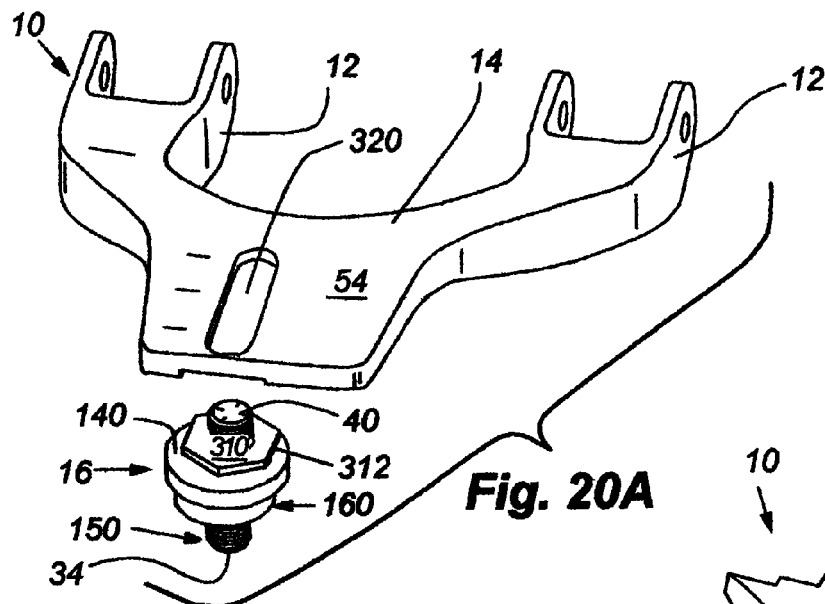
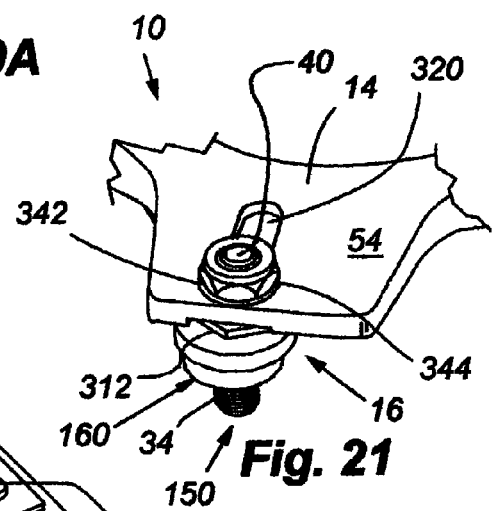
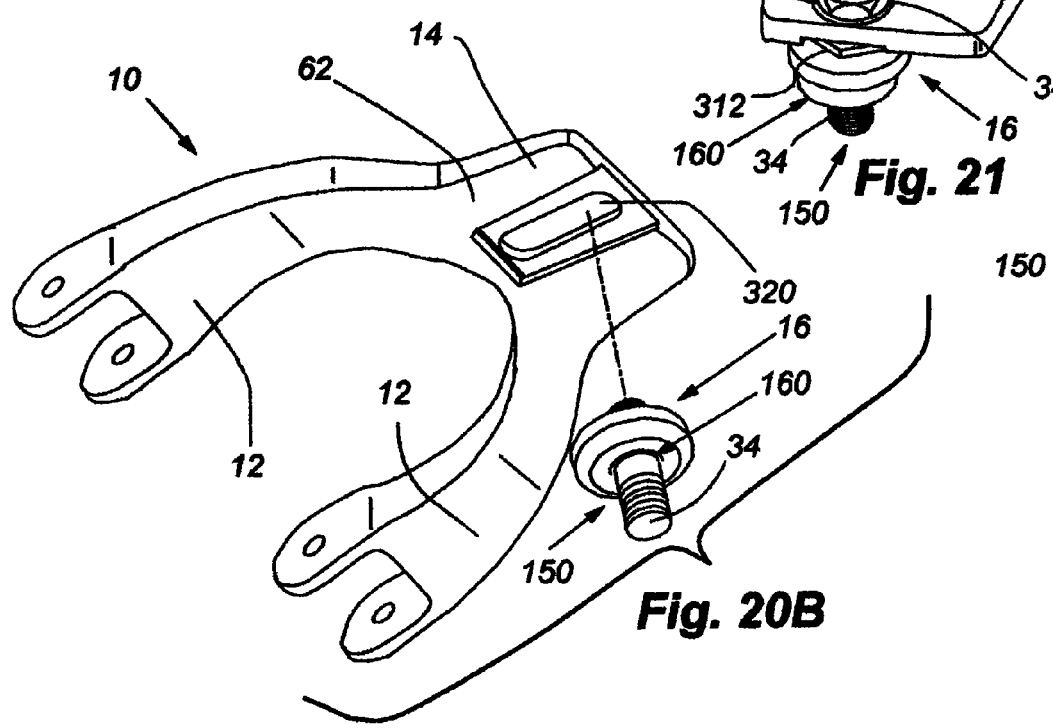
Fig. 20A
Fig. 21
Fig. 20B

ADJUSTABLE BALL JOINT CONNECTION ASSEMBLY

RELATED APPLICATIONS

This application claims priority to U.S. Provisional Patent Appl. Ser. No. 60/623,516, entitled Adjustable Ball Joint Connection Assembly, filed on Oct. 29, 2004, which is incorporated by reference herein.

FIELD OF THE INVENTION

This invention relates to suspension systems for motor vehicles, and more particularly, to control arm and ball joint connection assemblies that provide for adjustment of the camber angle, the caster angle, or both, of a vehicle wheel and associated suspension system components.

BACKGROUND OF THE INVENTION

Camber angle is a measure of how much a wheel or tire on a vehicle leans or tilts, either inward toward or outward from the vehicle, when viewed from the front or back of the vehicle. As such, the camber angle can be defined in different ways by measuring the relative positions of various components on a vehicle. FIGS. 1A and 1B illustrate one example of a measurement of the camber angle, which is defined by the angle between a vertical line and a wheel centerline as viewed from the front of the wheel. The camber angle illustrated in FIGS. 1A and 1B can also be defined as positive or negative. As shown in FIG. 1A, an outward tilt (away from the vehicle) of a top portion of the wheel results in a positive camber angle, and an inward tilt (toward the vehicle) of the top portion of the wheel results in a negative camber angle, as shown in FIG. 1B.

Caster angle is typically defined by the angle between a vertical line and a line drawn through upper and lower steering pivots, as viewed from either side of the vehicle. As such, the caster angle can also be defined in different ways by measuring the relative positions of various components on a vehicle. For example, the caster angle can be defined as the angle between a vertical line and a caster reference line drawn either through an upper strut mount and a lower ball joint or through an upper ball joint and the lower ball joint. FIGS. 2A and 2B illustrate one example of a measurement of the caster angle, which can also be defined as positive or negative. As shown in FIG. 2A, a forward tilt of the caster reference line results in a negative caster angle, and a rearward tilt the caster reference angle results in a positive caster angle, as shown in FIG. 2B. The caster and camber angles can be defined in various other ways in relation to other vehicle components, and should not be limited to the descriptions and illustrations provided herein.

Aspects of the present invention involve control arms and ball joint assemblies for use on motor vehicle suspension systems. Described and depicted herein are various configurations of control arms and ball joint assemblies that allow a user to make various adjustments to the caster and/or camber angles of the suspension system during wheel alignment.

BRIEF SUMMARY OF INVENTION

An embodiment of the present invention is a ball joint assembly for coupling a control arm with a spindle in a motor vehicle suspension system. The ball joint assembly includes a housing, a ball seat, and a ball joint member. The housing includes an integral first stud extending from the housing. The ball seat is operatively associated with the housing. The ball joint member includes a first end portion operatively associated with the ball seat and a second end portion defined by a second stud.

Another embodiment of the present invention is a control arm assembly for a motor vehicle system. The control arm assembly includes a control arm body, a first swivel plate, and a second swivel plate. The control arm body is defined by a first and second connection members extending from a ball joint connection portion. The first swivel plate includes a first slot encompassed by an upper track. The second swivel plate includes a second slot. The first swivel plate is operatively associated with the second swivel plate, and the first swivel plate and the second swivel plate are adjustably operatively associated with the ball connection portion.

Another embodiment of the present invention is a control arm for a motor vehicle suspension system. The control arm includes a main control arm body. The main control arm body is defined by a first connection member and a second connection member extending from a ball joint connection portion. The ball joint connection portion includes a first slot. A first side of the ball joint connection portion includes a first track surface encompassing the first slot.

Another embodiment of the present invention is a motor vehicle suspension system. The motor vehicle suspension kit includes a ball joint assembly and a control arm. The ball joint assembly includes a housing, a ball seat, and a ball joint member. The housing includes an integral first stud extending from the housing. The ball seat is operatively associated with the housing. The ball joint member includes a first end portion operatively associated with the ball seat and a second end portion defined by a second stud. The control arm includes a main control arm body. The main control arm body is defined by a first connection member and a second connection member extending from a ball joint connection portion. The ball joint connection portion includes a first slot. A first side of the ball joint connection portion includes a plurality of walls defining a first track surface encompassing the slot. When the ball joint assembly is operatively associated with the control arm, the housing is engaged with at least two of the plurality of walls and the first stud extends through the slot.

Another embodiment of the present invention is a housing for operatively associating a ball joint member with a control arm in a motor vehicle. The housing includes a housing body, a raised surface, and an integral stud. The housing includes a first surface. A raised surface extends from the first surface, and the integral stud extends from the raised surface.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF DRAWINGS

FIG. 4D is a top perspective view of an upper swivel plate operatively associated with the control arm.

FIG. 4E is a bottom perspective view of a lower swivel plate operatively associated with the control arm.

FIG. 4F is a simplified cross-section view of the upper and lower swivel plate operatively associated with the control arm at section line 4F-4F in FIG. 4D.

FIG. 4G is a simplified cross-section view of the upper and lower swivel plate operatively associated with the control arm at section line 4G-4G in FIG. 4D.

FIG. 9B is an exploded perspective view of the first ball joint assembly.

FIG. 9C is another exploded perspective view of the first ball joint assembly.

FIG. 10 is a perspective view of a ball seat.

FIG. 11 is a perspective view of a ball stud member.

FIG. 12A is an exploded perspective view of a nut and washer assembly.

FIG. 12B is a comparison of the height difference between a flanged nut and washer assembly and a flat nut and washer assembly.

FIG. 13C is a simplified cross-sectional view of the embodiment of the ball joint assembly operatively associated with the control arm via upper and lower swivel plates at section line 13C-13C in FIG. 13A.

FIG. 20A is a top perspective view of an embodiment of a control body and an embodiment of a ball joint assembly.

FIG. 20B is a bottom perspective view of the control body and the ball joint assembly.

FIG. 21 is a top perspective view of an embodiment of the control arm operatively associated with an embodiment of the ball joint assembly.

DETAILED DESCRIPTION

Figure 1A:
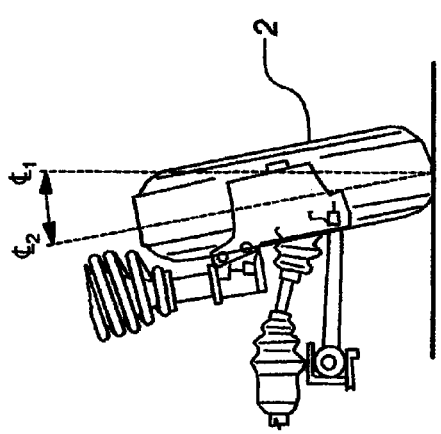
FIG. 1A is a front elevation of a wheel suspension system for a vehicle illustrating positive camber.
Figure 2A:
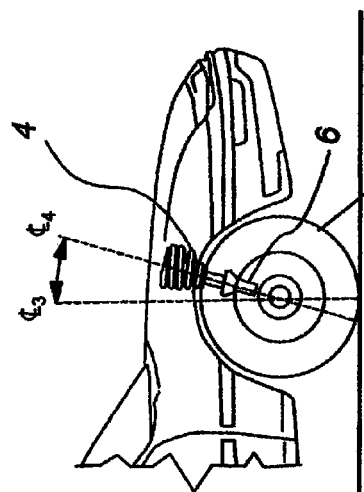
FIG. 2A is a side elevation of a front portion of a vehicle illustrating positive caster.
Figure 1B:
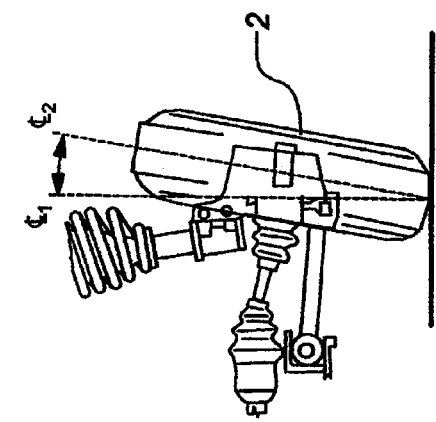
FIG. 1B is a front elevation of a wheel suspension system for a vehicle illustrating negative camber.
Figure 2B:
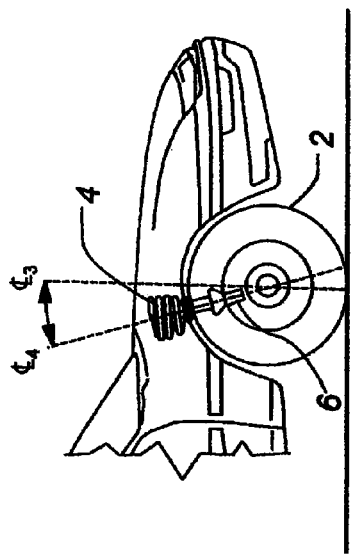
FIG. 2B is a side elevation of a front portion of a vehicle illustrating negative caster.

FIGS. 1A and 1B illustrate one example of a measurement of the camber angle. In these figures, the camber angle is shown as being defined by the angle between a vertical CL1 line and a wheel centerline CL2 as viewed from the front of the wheel 2. As shown in FIG. 1A, an outward tilt (away from the vehicle) of a top portion of the wheel defines a positive camber angle. An inward tilt (toward the vehicle) of the top portion of the wheel defines a negative camber angle, as shown in FIG. 1B. FIGS. 2A and 2B illustrate one example of a measurement of the caster angle. In these figures, the caster angle is shown as the angle between a vertical line CL3 and a caster reference line CL4 drawn through an upper strut mount 4 and a lower ball joint 6. As shown in FIG. 2A, a forward tilt of the caster reference line CL4 results in a negative caster angle. A rearward tilt the caster reference angle results in a positive caster angle, as shown in FIG. 2B. The caster and camber angles can be defined in various other ways in relation to other vehicle components, and should not be limited to the descriptions and illustrations provided herein.

Figure 3:
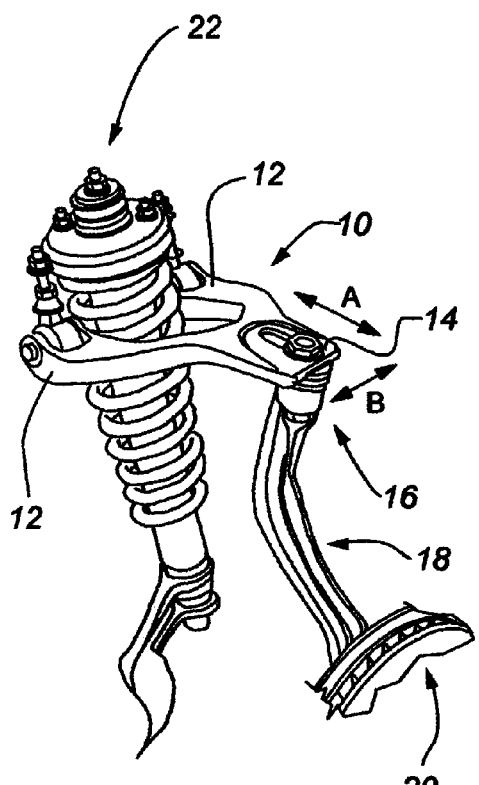
FIG. 3 is a perspective view of a portion of a wheel suspension system of a vehicle.

FIG. 3 illustrates a utilization of an embodiment of a control arm and a ball joint assembly of the present invention in a front suspension of a motor vehicle. The control arm 10 includes a generally Y-shaped body defined by a pair of tower connection members 12 extending outwardly from a ball joint connection portion 14. As shown in FIG. 3, the ball joint connection portion 14 of the control arm 10 is adjustably operatively associated with the ball joint assembly 16, which in turn, is operatively associated with an upper end portion of an elongated member 18 extending downwardly therefrom. The elongated member 18 is sometimes referred to as a spindle or a knuckle. A lower end portion of the spindle is operatively associated with a wheel mounting assembly 20, partially represented in FIG. 3 as including a brake disk. The tower connection members 12 of the control arm 10 are pivotally connected with an inner fender portion or a strut tower (not shown) on the vehicle. An upper end portion of a strut 22 is also connected with the strut tower on the vehicle. The strut 22 extends downward from the strut tower and is coupled with a lower control arm (not shown) through damper connection members.

In the suspension system shown in FIG. 3, the camber angle, the caster angle, or both, can be altered by changing the position of the connection between the ball joint assembly 16 and the upper end portion of the spindle. More particularly, the camber angle is altered by moving the connection between the ball joint assembly 16 and the upper portion of the spindle either inward toward or outward away from the vehicle as represented by the directional arrow labeled "A" in FIG. 3. The caster angle is altered by moving the connection between the ball joint assembly 16 and the upper portion of the spindle either forward or rearward as represented by the directional arrow labeled "B" in FIG. 3. As discussed in more detail below, embodiments of the present invention allow a user to alter the position of the connection between the ball joint assembly 16 and the upper portion of the spindle by changing the positions of the studs of the ball joint assembly 16 relative to the control arm 10.

Figure 4A:
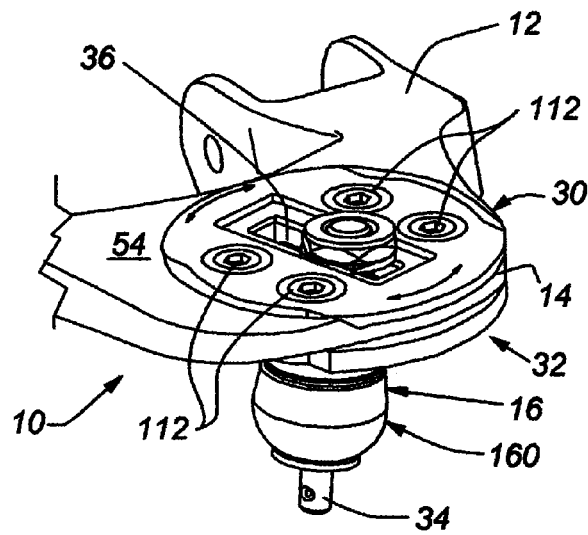
FIG. 4A is a top perspective view of a control arm and ball joint assembly.
Figure 4B:
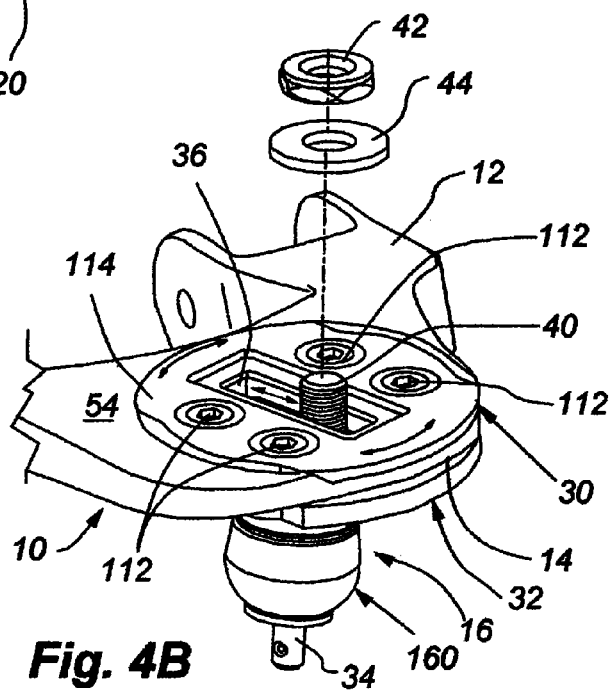
FIG. 4B is another top perspective view of the control arm and ball joint assembly with a nut and washer shown in exploded view.
Figure 4C:
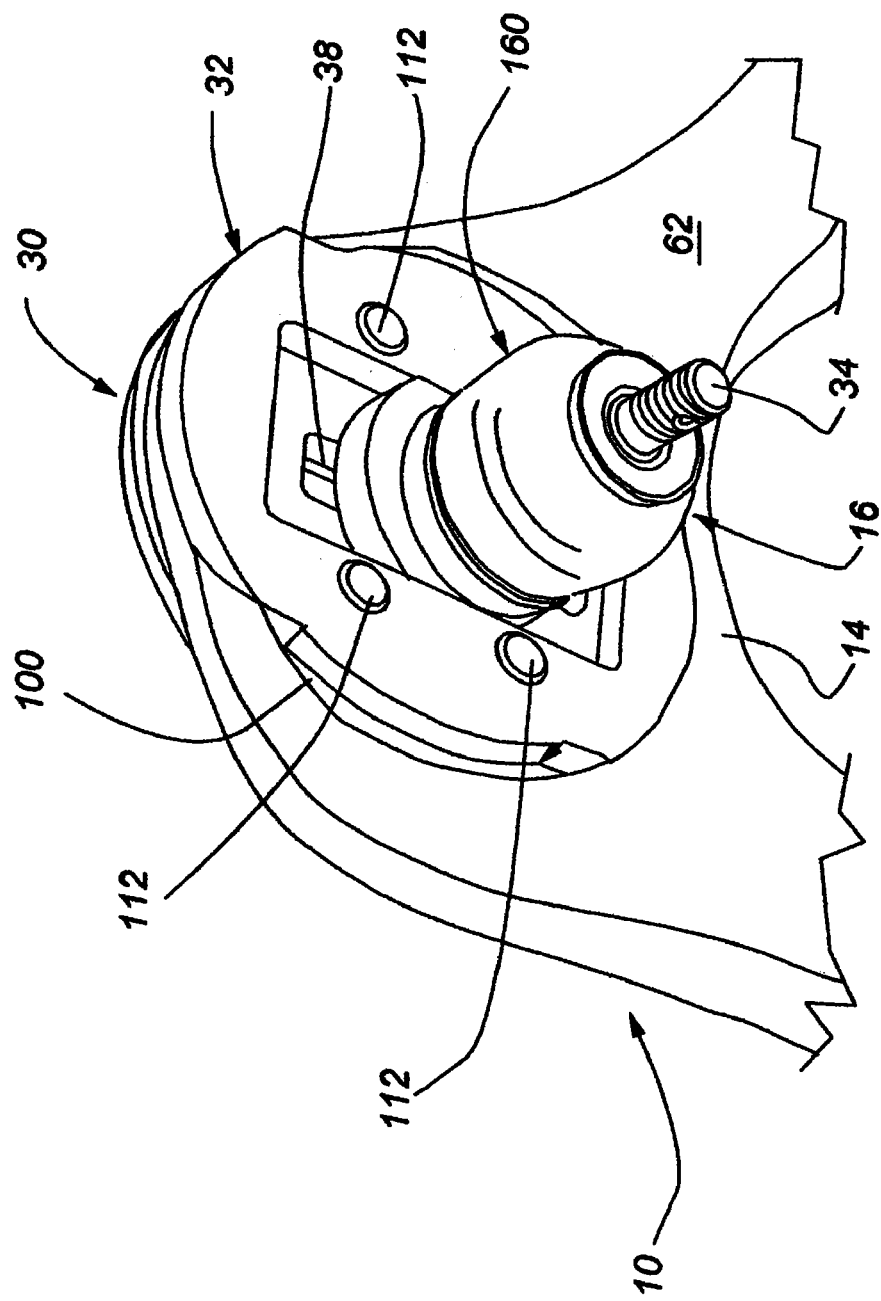
FIG. 4C is a bottom perspective view of a ball joint assembly operatively associated with the control arm.

FIGS. 4A, 4B, and 4C illustrate various views of an embodiment of an operative association between a first embodiment of the ball joint assembly 16 and a first embodiment of the control arm 10 using an upper and lower swivel plate 30, 32. The control arm 10 is generally Y-shaped and is defined by two tower connection members 12 extending from a ball joint connection portion 14. The two tower connection members 12 are adapted to be pivotally connected with an inner fender portion (shown in FIG. 3) or a strut tower (not shown) on a vehicle. The ball joint assembly 16 is adapted to be operatively associated with a spindle (shown in FIG. 3) via a first stud 34. The ball joint assembly 16 is also adapted to be operatively associated with the ball joint connection portion 14 of the control arm 10 via the upper swivel plate 30 and the lower swivel plate 32. In particular, as shown best in FIGS. 4D and 4E, when the upper and lower swivel plates 30, 32 are operatively associated with the control arm 10, an upper slot 36 in the upper swivel plate 30 is generally aligned with a lower slot 38 in the lower swivel plate 32 to form a co-aligned slot. Turning back to FIGS. 4A, 4B, and 4C, a second stud 40 extending from the ball joint assembly 14 is adapted to extend through the slot formed by the aligned upper and lower slots 36, 38 in the upper and lower swivel plates 30, 32. The second stud 40 is threaded to receive a nut 42 and washer 44 from the top to operatively associate the ball joint assembly 16 with the control arm 10.

The caster angle, the camber angle, or both, can be adjusted using the ball joint assembly 16 and control arm 10 described herein. As described in more detail below, there are various methods to adjust to the caster angle, the camber angle, or both, including moving the second stud 40 of the ball joint assembly 16 along the length of the slot formed using the upper and lower swivel plates 30, 32 and/or rotating the upper and lower swivel plates 30, 32 relative to the control arm 10. By allowing for the camber angle, the camber, angle, or both, to be adjusted by moving the second stud 40 along the length of the slot and/or rotating the upper and lower swivel plates 30, 32 relative to the control arm 10, a wide range of adjustments for the caster angle and the camber angle are possible.

For illustrative purposes, various methods of adjusting only the camber angle, only the caster angle, or both will be described. The camber angle may be adjusted, with minimal impact on the caster angle, by selectively moving the second stud 40 along the length of the slot formed by aligning the upper and lower slots 36, 38 in the upper and lower swivel plates 30, 32 when the slot is generally aligned with directional arrow "A" (shown in FIG. 3). Similarly, the camber angle can be adjusted, with minimal impact on the caster angle, by rotating the upper and lower swivel plates 30, 32 approximately 180 degrees when the slot is generally aligned with directional arrow "A" (shown in FIG. 3). The caster angle can be adjusted, with minimal impact on the camber angle, by selectively moving the second stud 40 along the length of the slot when the slot is generally aligned with directional arrow "B" (shown in FIG. 3). Similarly, the caster angle can be adjusted, with minimal impact on the camber angle, by rotating the upper and lower swivel plates 30, 32 approximately 180 degrees when the slot is generally aligned with directional arrow "B" (shown in FIG. 3).

Both the caster angle and the camber angle can be adjusted by selectively moving the second stud 40 along the length of the slot when the slot is generally aligned at an angle not in line with directional arrows "A" or "B" (shown in FIG. 3). Similarly, both the caster angle and the camber angle can be adjusted by rotating the upper and lower swivel 30, 32 plates approximately 45 degrees relative to the control arm 10 when the slot is generally in the direction of arrow "A" (shown in FIG. 3). These examples are merely illustrative and are not intended to limit the possible ways to adjust the camber angle, the caster angle, or both.

Figure 5A:
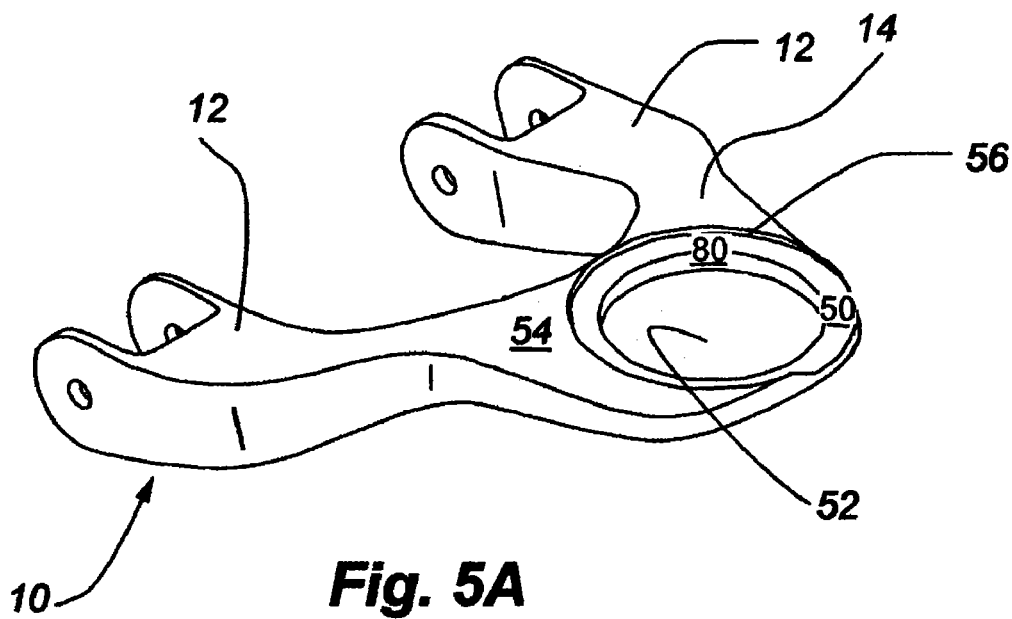
FIG. 5A is a top perspective view of a control arm.
Figure 5B:
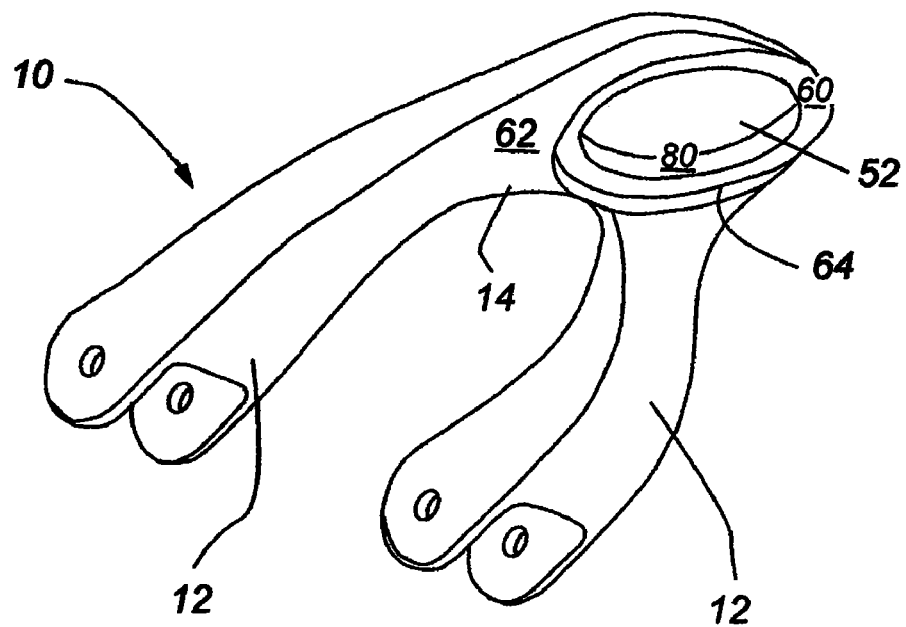
FIG. 5B is a bottom perspective view of the control arm.

FIGS. 5A and 5B illustrate an embodiment of the control arm 10. The control arm 10 is generally Y-shaped and is defined by two tower connection members 12 extending from a ball joint connection portion 14. As shown in FIG. 5A, an upper bearing surface 50 extends generally around an aperture 52 on a top surface 54 of the control arm 10. The upper bearing surface 50 is recessed within the top surface 54 to define an upper bearing wall 56. In the embodiment depicted in FIG. 5A, the upper bearing wall 56 forms a partial circle that extends approximately two-thirds of the way around the outer perimeter of the upper bearing surface 50. In some embodiments, however, the upper bearing wall 56 may extend more or less than two-thirds of the way around the outer perimeter of the upper bearing surface 50. Further, in some embodiments, the upper bearing wall 56 may form a shape other than a partial circle. For example, the upper bearing wall 56 could form the partial or complete perimeter of a polygon such as a square, a pentagon, hexagon, etc., of a curved shape such as an oval, ellipse, etc., or of any other geometric shape.

As shown in FIG. 5B, a lower bearing surface 60 extends generally around the aperture 52 on a bottom surface 62 of the control arm 10. The lower bearing surface 60 is recessed within the bottom surface 62 to define a lower bearing wall 64. In the embodiment depicted in FIG. 5B, the lower bearing wall 64 forms a partial circle that extends approximately two-thirds of the way around the outer perimeter of the lower bearing surface 60. In some embodiments, however, the lower bearing wall 64 may extend more or less than two-thirds of the way around the outer perimeter of the lower bearing surface 60. Further, in some embodiments, the lower bearing wall 64 may form a shape other than a partial circle. For example, the lower bearing wall 64 could form the partial or complete perimeter of a polygon such as a square, a pentagon, hexagon, etc., of a curved shape such as an oval, ellipse, etc., or of any other geometric shape.

Figure 6A:
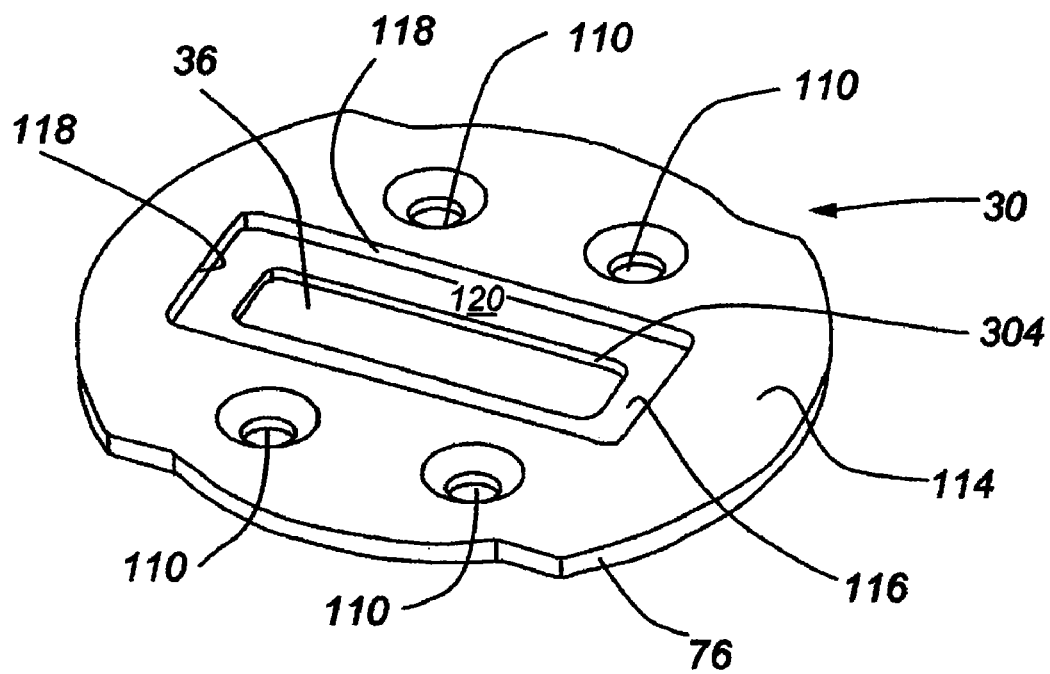
FIG. 6A is a top perspective view of an upper swivel plate.
Figure 6B:
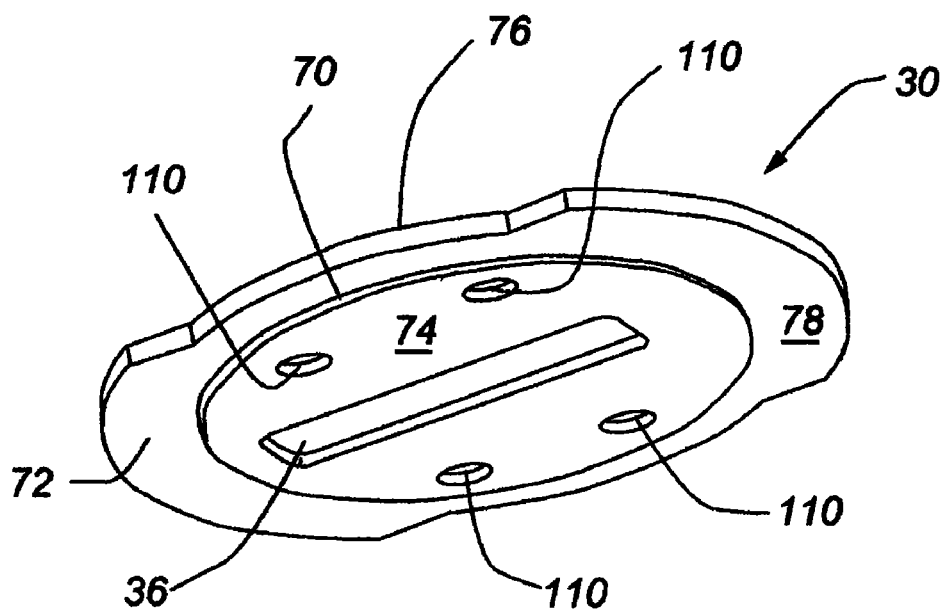
FIG. 6B is a bottom perspective view of the upper swivel plate.

FIGS. 6A and 6B depict upper and lower sides of an embodiment of the upper swivel plate 30. As shown in FIG. 6B, a wall 70 extending from a lower side of the upper swivel plate 30 defines a raised surface 74, which is adapted to be received within the aperture 52 of the control arm 10 as shown in FIGS. 4F and 4G. In the embodiment depicted in FIG. 6B, the wall 70 and the raised surface 74 have generally circular perimeters. In other embodiments, the perimeters may be a shape other than circular, or the raised surface 74 may be omitted. An area on the lower side of the upper swivel plate 30 between the wall 70 and an perimeter edge 76 of the upper swivel plate 30 defines an upper plate bearing surface 78. As shown in FIGS. 4F and 4G, the upper plate bearing surface 78 is adapted to engage the upper bearing surface 50 of the control arm 10 when the raised surface 74 of the upper swivel plate 30 is inserted into the aperture 52 of the control arm 10. As shown in FIGS. 4F and 4G, the wall 70 defining the raised surface 74 of the upper swivel plate 30 is adjacent to and approximately in contact with a surface 80 defining the aperture 52 of the control arm 10. In some embodiments, however, the wall 70 defining the raised surface 74 of the upper swivel plate 30 may not be approximately in contact with the surface 80 defining the aperture 52 of the control arm 10. For example, if the diameter of the circular raised surface 74 was less than the diametrical distance of the aperture 52 of the control arm 10, then the wall 70 defining the raised surface 74 of the upper swivel plate 30 may not be approximately in contact with the surface 80 defining the aperture 52 of the control arm 10.

As shown in FIGS. 6A and 6B, the perimeter edge 76 of the upper swivel plate 30 is defined by two opposing arcuate edges separated by two opposing recessed edges. The diametrical distance between the two opposing arcuate edges of the upper swivel plate 30 is slightly smaller than the diameter of the partial circle formed by the upper bearing wall 56 of the control arm 10. As such, depending upon the rotational orientation of the upper swivel plate 30 with respect to the control arm 10, one or both of the opposing arcuate edges of the upper swivel plate 30 may be adjacent to the upper bearing wall 56 of the control arm 10 when the raised surface 74 of the upper swivel plate 30 is inserted into the aperture 52 of the control arm 10. In the embodiment illustrated in FIGS. 4D and 4F, one of the opposing arcuate edges of the upper swivel plate 30 is adjacent to the upper bearing wall 56 of the control arm 10. In addition, a gap or gaps 82 may exist between the upper bearing wall 56 of the control arm 10 and either or both of the two opposing recessed edges of the upper swivel plate 30. In the embodiment illustrated in FIGS. 4D and 4F, there are gaps 82 between the upper bearing wall 56 of the control arm 10 and each of the two opposing recessed edges of the upper swivel plate 30. The gap or gaps 82 provide places to insert a tool to aid a user in rotationally adjusting the upper swivel plate 30 relative to the control arm 10. In other embodiments, the perimeter edge 76 of the upper swivel plate 30 may be other shapes. For example, the perimeter edge 76 may be generally circular, may be generally hexagonal, may have one arcuate edge opposed by a generally straight edge and separated by opposing recessed edges, etc. Depending upon the perimeter edge 76 selected, there may be no gaps 82 between the perimeter edge 76 of the upper swivel plate 30 and the upper bearing wall 56 of the control arm 10. For example, if the perimeter edge 76 of the upper swivel plate 30 is selected to be generally circular with a diameter that approximately matches the diameter of the partial circle formed by the upper bearing wall 56 of the control arm 10, then there would be no gaps 82 between the perimeter edge 76 of the upper swivel plate 30 and the upper bearing wall 56 of the control arm 10.

Figure 7A:
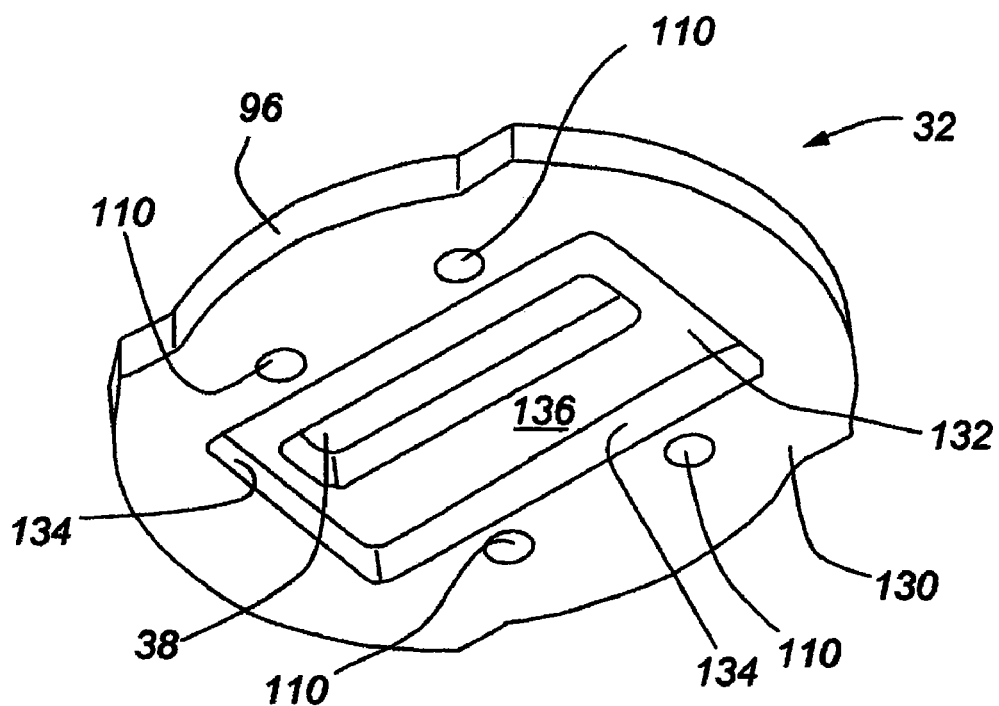
FIG. 7A is a bottom perspective view of a lower swivel plate.
Figure 7B:
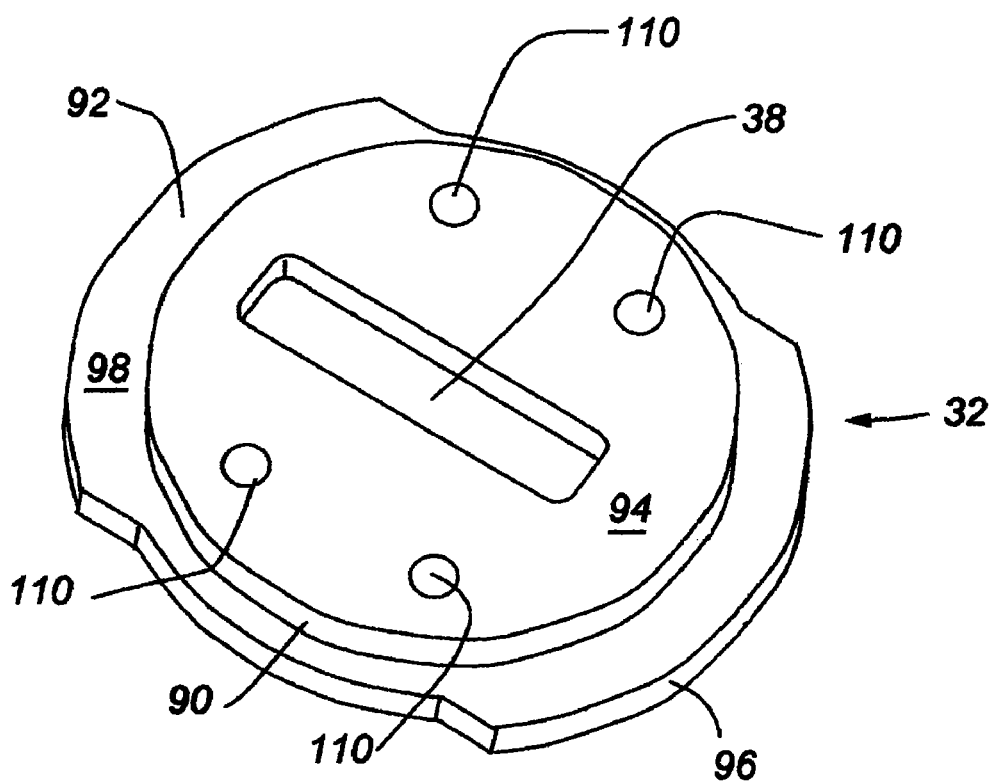
FIG. 7B is a top perspective view of the lower swivel plate.

FIGS. 7A and 7B depict upper and lower sides of an embodiment of the lower swivel plate 32. As shown in FIG. 7B, a wall 90 extending from an upper side 92 of the lower swivel plate 32 defines a raised surface 94, which is adapted to be received within the aperture 52 of the control arm 10 as shown in FIGS. 4F and 4G. In the embodiment depicted in the FIG. 7B, the wall 90 and the raised surface 94 have generally circular perimeters. In other embodiments, the perimeters may be a shape other than circular, or the raised surface 94 may be omitted. An area on the upper side 92 of the lower swivel plate 32 between the wall 90 and perimeter edge 96 of the lower swivel plate 32 defines a lower bearing surface 98. As shown in FIGS. 4F and 4G, the lower bearing surface 98 of the lower swivel plate 32 is adapted to engage the lower bearing surface 98 of the control arm 10 when the raised surface 94 of the lower swivel plate 32 is inserted into the aperture 52 of the control arm 10. As shown in FIGS. 4F and 4G, the wall 90 defining the raised surface 94 of the lower swivel plate 32 is adjacent to and approximately in contact with the surface 80 defining the aperture 52 of the control arm 10. In some embodiments, however, the wall 90 defining the raised surface 94 of the lower swivel plate 32 may not be approximately in contact with the surface 80 defining the aperture 52 of the control arm 10. For example, if the diameter of the circular raised surface 94 was less than the diametrical distance of the aperture 52 of the control arm 10, then the wall 90 defining the raised surface 94 of the lower swivel plate 32 may not be approximately in contact with the surface 80 defining the aperture 52 of the control arm 10.

Similar to the upper swivel plate 30, the perimeter edge 96 of the lower swivel plate 32, as depicted in the embodiment illustrated in FIGS. 7A, and 7B, is defined by two opposing arcuate edges separated by two opposing recessed edges. The diametrical distance between the two opposing arcuate edges of the lower swivel plate 32 is slightly smaller than the diameter of the partial circle formed by the lower bearing wall 64 of the control arm 10. As such, depending upon the rotational orientation of the lower swivel plate 32 with respect to the control arm 10, one or both of the opposing arcuate edges of the lower swivel plate may be adjacent to the lower bearing wall 64 of the control arm 10 when the raised surface 94 of the lower swivel plate 32 is inserted into the aperture 52 of the control arm 10. In the embodiment illustrated in FIGS. 4E and 4F, one of the opposing arcuate edges of the lower swivel plate 32 is adjacent to the lower bearing wall 64 of the control arm 10. In addition, a gap or gaps 100 exist between the lower bearing wall of the control arm and either or both of the two opposing recessed edges of the lower swivel plate 32. In the embodiment illustrated in FIGS. 4E and 4F, there are gaps 100 between the lower bearing wall 64 of the control arm 10 and each of the two opposing recessed edges of the lower swivel plate 32. The gap or gaps 100 provide places to insert a tool to aid a user in rotationally adjusting the lower swivel plate 32 relative to the control arm 10. In other embodiments, the perimeter edge 96 of the lower swivel plate 32 may be other shapes. For example, the perimeter edge 96 of the lower swivel plate 32 may be generally circular, may be generally hexagonal, may have one arcuate edge opposed by a generally straight edge and separated by opposing recessed edges, etc. Depending upon the perimeter edge 96 selected, there may be no gaps 100 between the perimeter edge 96 of the lower swivel plate 32 and the lower bearing wall 64 of the control arm 10. For example, if the perimeter edge 96 of the lower swivel plate 32 is selected to be generally circular with a diameter that approximately matches the diameter of the partial circle formed by the lower bearing wall 64 of the control arm 10, then there would be no gaps 100 between the perimeter edge 96 of the lower swivel plate 32 and the lower bearing wall 64 of the control arm 10.

With reference to FIGS. 4A, 4B, 4C, 4D, 4E, 6A, 6B, 7A, and 7B the upper and lower swivel plates 30, 32 include aligned fastener apertures 110 adapted for receiving fasteners 112 for operatively associating the upper swivel plate 30 to the lower swivel plate 32. In the embodiment depicted in FIGS. 4A and 4B, the upper and lower swivel plates 30, 32 are operatively associated by inserting screws through the fastener apertures 110 formed in the upper swivel plate 30 to be threadedly received in matching fastener apertures 110 in the lower swivel plate 32. When the screws are sufficiently tight, the swivel plates 30, 32 are pulled together to engage the bearing surfaces 50, 60 on the control arm 10 (see FIGS. 4F and 4G) with sufficient force that friction between the swivel plates 30, 32 and the control arm 10 prevents the swivel plates 30, 32 from rotating relative to the aperture 52 of the control arm 10. When the screws are sufficiently loosened, the swivel plates 30, 32 can be rotated relative to the aperture 52 of the control arm 10 as indicated by the directional arrows "D" in FIGS. 4A and 4B. As such, the rotational position of the slot formed by the aligned slots 36, 38 of the swivel plates relative to the control arm 10 can be adjusted by rotating the swivel plates 30, 32 relative to the aperture 52 of the control arm 10.

Fasteners 112 other than screws (e.g., bolts, pins, etc.) may be used to operatively associate the upper and lower swivel plates 30, 32. Additionally, other methods of operatively associating the swivel plates 30, 32 may be utilized. For example, threaded studs could extend from one of the swivel plates and be adapted to be received in aligned apertures in the other swivel plate. Nuts could be engaged with the threaded studs when the threaded studs of one swivel plate are inserted through the aligned apertures of the other swivel plate. The nut could be tightened or loosed as required to pull the swivel plates 30, 32 together to engage bearing surfaces 50, 60 on the control arm 10 or to permit the swivel plates 30, 32 to be rotated relative to the control arm 10.

As previously mentioned and as shown in FIG. 4A, the second stud 40 on the ball joint assembly 16 is adapted to extend through the slot formed by the aligned slots 36, 38 in the upper and lower swivel plates 30, 32. As shown in FIGS. 6A and 7A, the upper swivel plate 30 includes a generally rectangularly-shaped upper slot 36, and the lower swivel plate 32 includes a generally rectangularly-shaped lower slot 38. Shapes for the upper and lower slots 36, 38 of the upper and lower swivel plates 30, 32 other than generally rectangular may be utilized. When the raised surfaces 74, 94 on the upper and lower swivel plates 30, 32 are inserted into the aperture 52 of the control arm 10, the upper and lower slots 36, 38 of the upper and lower swivel plates 30, 32 can be aligned to form the single aligned slot, as shown in FIGS. 4A and 4B.

As shown in FIG. 6A, the upper side 114 of the upper swivel plate 30 includes an upper track 116 adapted to engage the ball joint assembly 16 and/or associated connection components to fix the rotational position of the ball joint assembly 16 relative to the swivel plates 30, 32. As shown in FIG. 6A, the upper track 116 in the upper side 114 of the upper swivel plate 30 is defined by track walls 118 and an upper track surface 120. The track walls 118 are spaced outwardly from the outer perimeter of the upper slot 36. The upper track surface 120 is recessed in the upper side 114 of the upper swivel plate 30 and defined by the outer perimeter of the upper slot 36 and the track walls 118. In the embodiment depicted in FIG. 6A, there are two opposing track walls 118 that are relatively long compared to two opposing track walls 118 that separate them. Further, the relatively long opposing track walls 118 are generally parallel to each other, and the relatively short opposing track walls 118 are generally parallel to each other. Thus, the upper track 116 in the upper swivel plate 30 has a generally rectangular planar area. Other shapes may be utilized for the planar area of the upper track 116 in the upper swivel plate 30. For example, the relatively shorter opposing track walls 118 of the upper swivel plate 30 could be generally arcuate rather than generally straight thereby creating a generally rectangular area with oval ends for the planar area of the upper track 116 of the upper swivel plate 30. In general, however, it can be useful to select a planar area for the upper track 116 of the upper swivel plate 30 in which there are a pair of opposing track walls 118 in the upper swivel plate 30 that run parallel to each other along the length of the upper slot 36 in the upper swivel plate 30. This can be useful because it generally permits the second stud 40 of the ball joint assembly 16 to be slid along a substantial length of the upper slot 36 in the upper swivel plate 30 while providing a maximum surface area on the tracks walls 118 for preventing rotation of the ball joint assembly 16 relative to the upper swivel plate 30.

As shown in FIG. 7A, the lower side 130 of the lower swivel plate 32 includes a lower track 132 adapted to engage the ball joint assembly 16 and/or associated connection components to fix the rotational position of the ball joint assembly 16 relative to the swivel plates 30, 32. As shown in FIG. 6A, the lower track 132 in the lower side 130 of the lower swivel plate 32 is defined by track walls 134 and lower track surface 136. The track walls 134 are spaced outwardly from the outer perimeter of the lower slot 38. The lower track surface 136 is recessed in the lower side 130 of the lower swivel plate 32 and defined by the outer perimeter of the lower slot 38 and the track walls 134. In the embodiment depicted in FIG. 7A, there are two opposing track walls 134 that are relatively long compared to two opposing track walls 134 that separate them. Further, the relatively long opposing track walls 134 are generally parallel to each other, and the relatively short opposing track walls 134 are generally parallel to each other. Thus, the lower track 132 in the lower swivel plate 32 has a generally rectangular planar area. Other shapes may be utilized for the planar area of the lower track 132 in the lower swivel plate 32. For example, the relatively shorter opposing track walls 134 of the lower swivel plate 32 could be generally arcuate rather than generally straight thereby creating a generally rectangular area with oval ends for the planar area of the lower track 132 of the lower swivel plate 32. In general, however, it can be useful to select a planar area for the lower track 132 of the upper swivel plate 32 in which there are a pair of opposing track walls 134 in the lower swivel plate 32 that run parallel to each other along the length of the lower slot 38 in the lower swivel plate 32. This can be useful because it generally permits the second stud 40 of the ball joint assembly 16 to be slid along a substantial length of the lower slot 38 in the lower swivel plate 32 while providing a maximum surface area on the tracks walls 134 for preventing rotation of the ball joint assembly 16 relative to the lower swivel plate 32.

Figures 8A, 8B:
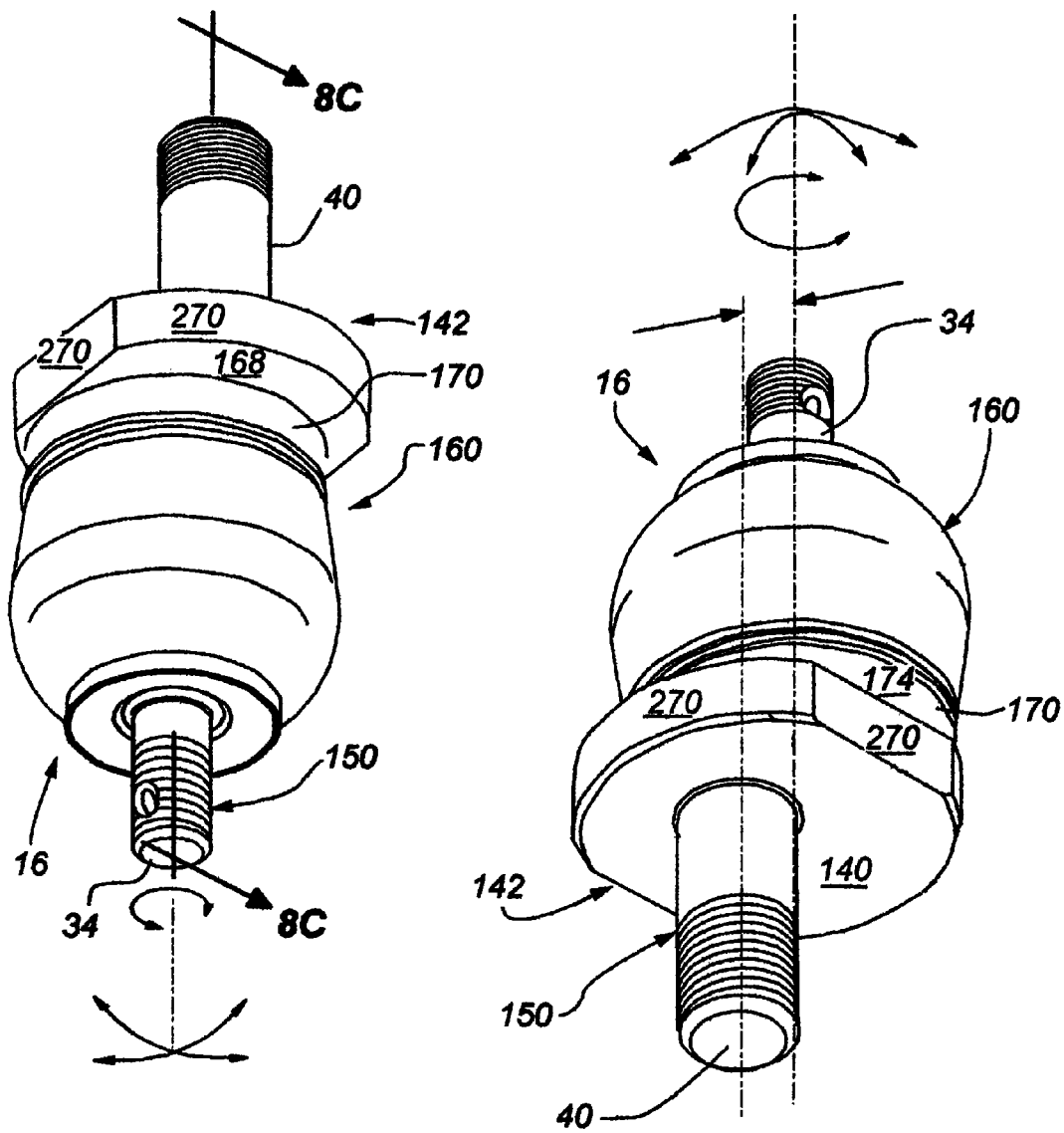
FIG. 8A is a side perspective view of an embodiment of a ball joint assembly.
FIG. 8B is a top perspective view of the embodiment of the ball joint assembly.
Figure 8C:
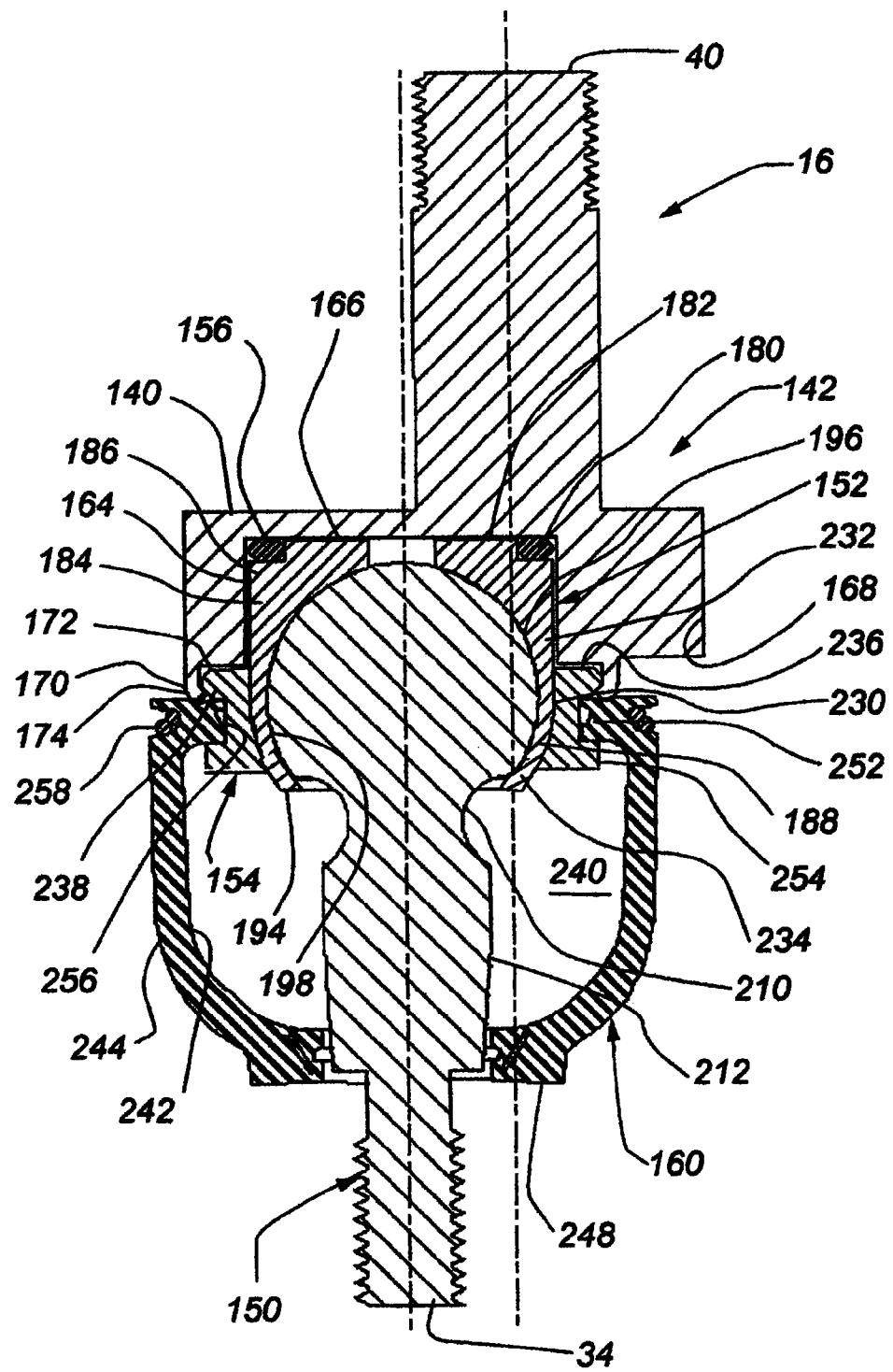
FIG. 8C is a simplified cross-sectional view of the embodiment of the ball joint assembly at section line 8C-8C in FIG. 8A.

FIGS. 8A, 8B, and 8C show an embodiment of the ball joint assembly 16 adapted to be operatively associated with the control arm 10 described above. The second stud 40 extends from a top surface 140 of a housing 142 of the ball joint assembly 16 and is adapted to be received within the slot formed when the upper and lower swivel plates 30, 32 are operatively associated. The second stud 40 can be integral with the housing 142 or the second stud 40 can be threaded onto or otherwise operatively associated with the housing 142. As discussed in more detail below and as shown in FIGS. 4A 4B, and 4C, when the ball joint assembly 16 is operatively associated with the control arm 10, the top surface 140 of the housing 142 of the ball joint assembly 16 engages the lower track surface 136 of the lower swivel plate 32, the second stud 40 of the ball joint assembly 16 extends through the slot formed by the upper and lower swivel plates 30, 32, and a washer 44 and a nut 42 are received on the second stud 40. The nut 42 is tightened to clamp the ball joint assembly 16 against the upper and lower swivel plates 30, 32, thereby inhibiting the second stud 40 of the ball joint assembly 16 from moving along the length of the slot formed by the upper and lower swivel plates 30, 32. When making adjustments during alignment, the nut 42 can be loosened to allow the user to move the second stud 40 of the ball joint assembly 16 along the length of the slot formed by the upper and lower swivel plates 30, 32 as illustrated by directional arrow "C" shown in FIG. 4A.

Referring again to FIGS. 8A, 8B, and 8C, the first stud 34, adapted to be operatively associated with the spindle (see FIG. 3), extends from the ball joint assembly 16 in an opposite direction from the second stud 40 of the ball joint assembly 16. As discussed in more detail below, the first stud 34 forms part of a ball stud member 150, which is operatively associated with the housing 142 of the ball joint assembly 16 through a ball seat 152 and ball seat retainer 154. As such, the first stud 34 of the ball joint assembly 16 can pivot and rotate relative to the housing 142 of the ball joint assembly 16 as shown by directional arrows "E" in FIGS. 8A and 8B.

As shown in FIGS. 8A, 8B, and 8C, the second stud 40 of the ball joint assembly 16 does not extend from the center of the top surface 140 of the housing 142 (i.e., the longitudinal axis of the second stud 40 is offset from the center of the top surface 140 of the housing 142 at the point where the second stud 40 extends from the top surface 140 of the housing 142). In some embodiments, however, the second stud 40 of the ball joint assembly 16 may extend from the center of the top surface 140 of the housing 142. As shown in FIG. 8C, a lower portion of the first stud 34 of the ball joint assembly 16 is horizontally offset from an upper portion of the second stud 40 of the ball joint assembly 16. In some embodiments, however, the horizontal offset of the lower portion the first stud 34 of the ball joint assembly 16 to the upper portion of the second stud 40 of the ball joint assembly 16 may be approximately zero (i.e., the horizontal location of the lower portion of the first stud 34 will generally coincide with the horizontal location of the upper portion of the second stud 40).

Figure 9A:
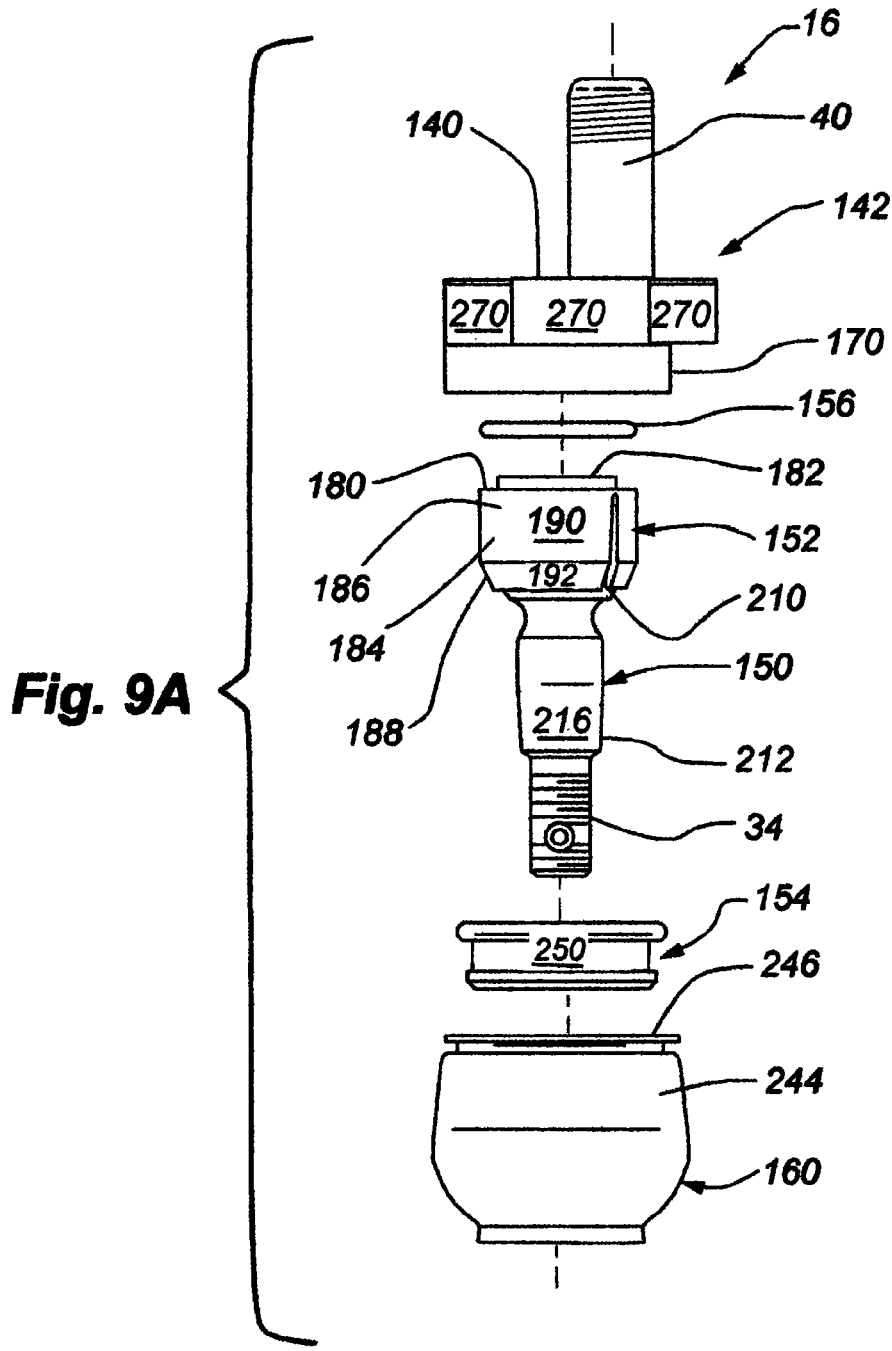
FIG. 9A is a side elevation exploded view of the first ball joint assembly.

FIGS. 9A, 9B and 9C show various exploded views illustrating an embodiment of various components of the ball joint assembly 16. As shown in FIGS. 9A, 9B, and 9C, the ball joint assembly 16 includes the housing 142, the ball seat 152, the ball stud member 150, a flexible member 156, a ball seat retainer 154, and a boot 160. FIG. 8C depicts a cross-section of the ball joint assembly 16 with its components assembled. As shown in FIG. 8C, the ball stud member 150 is operatively associated with the ball seat 152; the flexible member 156 and a portion of the ball seat 152 are received within a cavity in the housing 142; the ball seat retainer 154 is operatively associated with the ball seat 152 and the housing 142; and the boot 160 is operatively associated with the ball seat retainer 154.

With reference to FIGS. 8C, 9A, 9B, and 9C, an embodiment of the housing 142 will be described. An inner side surface 164 and an inner top surface 164 of the housing 142 define the cavity 162 within the housing 142. The cavity 162 includes a closed bottom and is operative to receive the ball seat 152 and the flexible member 156. The cavity 162 extends into the housing 142 from an opening defined in a bottom surface 168 of the housing 142, and a wall 170 surrounding the opening extends from the bottom surface 168. The wall 170 includes an inner perimeter defined by an inner surface 172 of the wall 170 and an outer perimeter defined by an outer surface 174 of the wall 170. The inner perimeter of the wall 170 is greater than the perimeter of the opening to define an area on the bottom surface 168 of the housing 142 between the wall 170 and the opening. The wall 170 is adapted to receive the ball seat 152 between the inner surface 172 of the wall 170 and to operatively associate the ball seat 152 with the housing 142. In the depicted embodiment, the inner top surface 166, the perimeter of the inner side surface 164, and the opening are generally circular. Other shapes, however, may be used for the inner top surface 166, the perimeter of the inner side surface 164, and the opening. For example, each of these elements could be square, hexagonal, octagonal, or any other shape that defines in the housing 142 a cavity 162 and an opening adapted to receive the ball seat 152 and the flexible member 156. In the embodiment depicted in FIGS. 8C, 9A, 93, and 9C, the inner and outer perimeters of the wall 170 are generally circular along the depth of the wall 170. Other shapes, however, may be used for the inner and outer perimeters of the wall 170 along the depth of the wall 190. For example, the inner and outer perimeters could be square, hexagonal, octagonal, or any other shape that allows the wall 170 to receive the ball seat 152 the inner surface 172 of the wall 170.

With reference to FIG. 10, an embodiment of the ball seat 152 will be described. The ball seat 152 includes a top end 180 having a generally flat surface including an extension 182 (see FIG. 9C) adapted to receive the flexible element 156. In the embodiment depicted in FIG. 10, the top end 180 of the ball seat 152 is generally circular with a diameter that approximately matches the diameter of the generally cylindrical shaped cavity 162 defined by the inner side surface 164 of the housing 142. The top end 180, however, could be other shapes. For example, the top end 180 could be generally square, hexagonal, or octagonal or any other shape that generally matches the perimeter of the inner side surface 164 of the housing 142. The ball seat 152 also includes a side wall 184 with an upper and lower portion 186, 188. In the embodiment depicted in FIGS. 8C, 9A, 9B, 9C, and 10, the upper portion 186 of the side wall 184 has a generally cylindrical shaped outer surface 190 along the depth of the upper portion 186 with diameters along the depth that approximately match or are less than the diameter of the generally cylindrical shaped cavity defined by the inner side surface 164 of the housing 142. The outer surface 190 of the upper portion 186 of the side wall 184, however, could be other shapes. For example, the outer surface 190 could be generally square, hexagonal, or octagonal along the depth of the upper portion 186 of the side wall 184, or any other shape that generally matches the shape of the cavity 162 defined by the inner side surface 164 of the housing 142.

As shown in the embodiment depicted in FIGS. 8C, 9A, 9B, 9C, and 10, the outer surface 192 of the lower portion 188 of the side wall 184 is generally circular along the depth of the lower portion 188. The diameters of this generally circular outer surface 192 for the lower portion 188 decrease moving from a lower end of upper portion 186 of the side wall 184 to a bottom end 194 of the ball seat 152, thereby defining a generally conical shape for the outer surface 192 of the lower portion 188 of the side wall 184. This generally conical outer surface 192 is adapted to bear on a surface of a ball seat retainer 154 as further described below. The bottom end 194 of the ball seat 152 generally defines a circular shape. The outer surface 192 of the lower portion 188 of the side wall 184, could be other shapes. For example, the outer surface 192 of the lower portion 188 could be generally square, hexagonal, or octagonal along the depth of the lower portion 188 of the side wall 184, or any other shape that generally allows the outer surface 192 of the lower portion 188 of the side wall 184 to bear on a surface of the ball seat retainer 154.

The inner surfaces 196, 198 of the upper and lower portion 186, 188 of the side wall 184 of the ball seat 192 define a cavity 200 adapted to receive and generally retain the ball stud member 150. The inner surface 196 of the upper portion 186 of the side wall 184 is generally spherical with dimensions that that approximately match or are greater than the dimensions of the portion of the ball stud member 150 received within the cavity 200 of the ball seat 152. The inner surface 196 of the upper portion 186 of the side wall 184, however, could be other shapes. For example, the inner surface 196 could be generally cylindrical along the depth of the upper portion 186 of the side wall 184, or any other shape that generally allows a portion of the ball stud member 150 to be received within the cavity 200 of the ball seat 152. The inner surface 198 of the lower portion 188 of the side wall is generally partially conical along the depth of the lower portion 188. The diameters of this generally conical inner surface 198 for the lower portion 188 decrease as one moves from a lower end of upper portion 186 of the side wall 184 to a bottom end 194 of the ball seat 152, thereby defining an inwardly sloping surface for the inner surface 198 of the lower portion 188 of the side wall 184. This inner surface 198 approximately matches a lower portion of the ball stud member 150 received within the cavity 200 of the balls seat 152, thereby generally retaining the portion of the received ball stud member 150 within the cavity 200. The inner surface 198 of the lower portion 188 of the side wall 184, however, could be other shapes. For example, the inner surface 198 of the lower portion 188 could be generally square, hexagonal, or octagonal along the depth of the lower portion 188 of the side wall 184, or any other shape that generally allows a portion of the ball stud member 150 received within the cavity 200 of the ball seat 152 to be retained within the cavity 200 of the ball seat 152.

FIG. 11 depicts an embodiment of the ball stud member 150. As shown in FIG. 11, the ball stud member 150 includes a ball end portion 210 separated from the first stud 34 by a middle portion 212. An outer surface 214 of the ball end portion 210 is generally spherically shaped with a generally cylindrical portion extending from the spherical shape. The spherically shaped outer surface 214 of the ball end portion 210 is adapted to be received within the cavity 200 of the ball seat 152 as shown in FIG. 8C. A lower portion of the outer surface 214 is adapted to match the inner surface 198 of the lower portion 188 of the ball seat 152. The generally spherical shape of the outer surface 214 of the ball end portion 210 is useful because it allows the first stud 34 of the ball stud member 150 to be pivoted and rotated relative to the ball seat 152. Turning back to FIG. 11, the cylindrically shaped portion of the ball end portion 210 that extends from the spherically shaped outer surface 214 connects with the middle portion 212 of the ball stud member 150. An outer surface 216 of the middle portion 212 of the ball stud member 150 is generally cylindrically shaped along its length. An outer surface 218 of the first stud 34 of the ball stud member 150 is also generally cylindrically shaped along its length. As shown in the embodiment depicted in FIG. 11, the diameter of the cylindrically shaped middle portion 212 is greater than both the diameter of the cylindrically shaped first stud 34 and the diameter of the cylindrically shaped portion of the ball end portion 210. In other embodiments, the diameters of the cylindrical shapes may be approximately equivalent for all portions of the ball stud member 150 or the diameter of the first stud 34 and/or the cylindrical portion 210 of the ball end portion may be greater than the diameter of the middle portion 212. The first stud 34 of the ball stud member 150 includes a hole 220. The hole 220 may be used in conjunction with a fastener or other connection element to operatively associate the first stud 34 with a spindle, knuckle, or other similar vehicle component.

Although the elements of the ball stud member 150 (i.e., the ball end portion 210, the first stud 34, and the middle portion 212) are depicted as integral, each component could be an individual component that is associated with the other components. For example, the ball end portion 210 could have a threaded aperture adapted to engage a threaded portion of the middle portion 210, and the middle portion 212 could have a threaded aperture adapted to engage a threaded portion of the first stud 34. Other methods of operatively associating the components of the ball stud member 150, other than the one described may be utilized. Further, each component may be integral with one component and separate from another component or could be combined with another component to create one component. For example, the ball end portion 210 could be integral with the middle portion 212 and not integral with the first stud 34. As another example, the first stud 34 and middle portion 212 could be a single component. The foregoing examples are merely illustrative of some of the potential integrations and combinations of components that may be used to form the ball stud member 150.

The ball stud member 150 is operatively associated with the ball seat 152. With reference to FIG. 8C, one method of operatively associating the ball stud member 150 with the ball seat 152 will be described. Specifically, the ball end portion 210 of the ball stud member 152 is received within the cavity 200 in the ball seat 152, as shown in FIG. 8C. The inner surface 198 of the lower portion 188 the sidewall 184 defining the cavity 200 is adapted to partially surround the outer surface 214 of the ball end portion 210 of the ball stud member 150 to retain the ball stud member 150 while permitting the first stud 34 of the ball stud member 150 to rotate and pivot relative to the housing 142 of the ball joint assembly 16 as shown by directional arrows "E" in FIGS. 8A and 8B.

Once the ball stud member is operatively associated with the ball seat 152, the ball seat 152 may be operatively associated with the housing 142. As shown in FIG. 8C, the flexible member 156 and the ball seat 152, operatively associated with the ball stud member 150, are received within the cavity 162 of the housing 142. Utilization of the flexible member 156 can be useful because it can the occupy a space left in the cavity 162 of the housing 142 when the ball seat 152 is received within the cavity 162, thereby permitting a relatively tight fit within the cavity 162 for the ball seat 152. Utilization of the flexible member 156 can also be useful because it imposes a force upon the ball seat 152 that causes the ball seat 152 to exert a bearing force on a surface of a ball seat retainer 154 adapted to bear the ball seat 152, thereby increasing a friction force that resists rotation of the ball seat 152 relative to the ball seat retainer 154. The flexible member 156 may be an O-ring or any other flexible material that can adapt to occupy a varying space as the ball seat 152 is received within the cavity 162 of the housing 142.

The flexible member 156 and ball seat are received within the cavity 162 defined in the housing 142 until the extension 182 on the top end 180 of the ball seat 152 is approximately adjacent the inner top surface 166 of the housing 142. As the ball seat 152 is received within the cavity 162, the flexible member 156 will generally be compressed to occupy a space defined by the inner top surface 166 and the inner side surface 164 of the housing 142 and the extension 182 and the top end 180 of the ball seat 152. The compression of the flexible member 156 causes the flexible member 156 to exert a resisting force on the ball seat 152. This resisting force will tend to push ball seat 152 out of the cavity 162.

The ball seat retainer 154, when operatively associated with the housing 142 may be used to counter the resisting force exerted on the ball seat 152 by the flexible member 156 and push the ball seat 152 back into the cavity 162, thereby operatively associating the ball seat 152 with the housing 142. In particular, the ball seat retainer 154 may be adapted to have the ball seat 152 bear on it as the flexible member 156 pushes the ball seat 152 away from the inner top surface 166 of the housing 142. As the ball seat 152 bears on the ball seat retainer 154, the ball seat retainer 154 supports the ball seat and forces it back into the cavity 162.

FIGS. 8C, 9A, 9B, and 9C depict an embodiment of the ball seat retainer 154 adapted to bear the ball seat 152 received within the cavity 162 of the housing 142 when the ball seat retainer 154 is operatively associated with the housing 142. The ball seat retainer 154 has an inner surface 230 with an upper and lower portion 232, 234. The upper and lower portions 232, 234 of the inner surface 230 of the ball seat retainer 154 may be adapted to approximately match respective portions of the outer surfaces 190, 192 upper and lower portions 186, 188 of the ball seat 152. In the embodiment depicted in FIGS. 8C, 9A, 9B, and 9C, the upper portion 232 of the inner surface 230 is generally cylindrical along the depth of the upper portion 232 with diameters along the depth that approximately match or are greater than the diametrical distance of the outer surface 190 of the upper portion 186 of the side wall 184 of the ball seat 152. The inner surface 230 of the upper portion 232 of the ball seat retainer 154, however, could be other shapes. For example, the inner surface 230 of the upper portion 232 of the ball seat retainer 154 could be generally square, hexagonal, or octagonal along the depth of the upper portion 232 of the ball seat retainer 154, or any other shape that generally allows the outer surface 190 of the upper portion 186 of the ball seat 152 to be inserted through the ball seat retainer 154.

The lower portion 234 of the inner surface 230 of the ball seat retainer 154 is partially conical to form a surface upon which at least a portion 188 the lower portion of the outer surface 192 of the ball seat 152 can bear. Since a portion of the ball seat 152 can bear upon this surface when the ball seat retainer 154 is operatively associated with the housing 142, the ball seat retainer 154 will tend to push the ball seat 152 back into the cavity 162 of the housing 142 as the flexible member 156 imposes a resisting force on the ball seat 152 that tends to push the ball seat 152 out of the cavity 162. More particularly, the ball seat retainer 154 is inserted over the ball seat 152 and the ball stud member 150 received within the cavity 162 of the housing 142 until a top edge 236 of a top lip 238 of the ball seat retainer 154 contacts the area on the bottom surface 168 of the housing 142. As such, the top lip 238 of the ball seat retainer 154 is received within the wall 170 extending from the bottom surface 168 of the housing 142, and the lower portion 188 of the outer surface 192 ball seat 152 received within the cavity 162 of the housing 192 bears upon the lower portion 234 of the inner surface 230 of the ball seat retainer 154. The wall 170 is angled, formed, or crimped inwardly over the top lip 238 of the ball seat retainer 154 to operatively associate the ball seat retainer 154 with the housing 142. Once the ball seat retainer 154 is operatively associated with the housing 142, it remains in a generally fixed location relative to the housing 142, thereby retaining the ball seat 152 and the ball stud member 150 in a generally fixed location relative to the housing 142. In the embodiment depicted in FIGS. 8C, 9A, 9B, and 9C, the top lip 238 of the ball seat retainer 154 has a perimeter that is generally circular. The perimeter, however, could be other shapes that are adapted to be received within the wall 170 on the bottom surface 168 of the housing 142. For example, if the perimeter defined by the inner surface 172 of the wall 170 extending from the bottom surface 168 of the housing 142 was generally hexagonal, then the perimeter of the top lip 238 could be hexagonal.

The boot 160 may be operatively associated with the ball seat retainer 154 to cover the ball seat retainer 154, the ball seat 152, and a portion of the ball stud member 150. In the embodiment depicted in FIGS. 8C, 9A, 9B, and 9C, the boot 160 includes a cavity 240 defined by an inner surface 242 of a side wall 244. A top surface 246 and a bottom surface 248 of the boot 160 each define an opening associated with the cavity 240. The opening defined in the top surface 246 of the boot 160 has a diametrical distance that matches or is greater than the diametrical distance of an outer surface 250 of the ball seat retainer 154, thereby allowing the ball seat retainer 154 to be received within the cavity 240 of the boot 160. The opening defined in the bottom surface 248 of the boot 160 has a diametrical distance that matches or is greater than the width of the first stud 34 of the ball stud member 150, thereby permitting the first stud 34 of the ball stud member 150 to extend through the opening defined in the bottom surface 248 of the boot 160. The length of the side wall 244 of the boot 160 and the cavity 240 defined by the inner surface 242 of the side wall 244 is sufficient to receive the ball seat 152, the ball seat retainer 154, and a portion of the ball stud member 150 within the cavity 240.

The boot 160 includes a groove 252 adapted to be received between the top lip 238 and a lower lip 254 of the ball seat retainer 154. An inner surface 256 of the groove 252 extends into the cavity 240 defined by the inner surface 256 of the boot 160 and is composed of material sufficiently flexible compared to the lower lip 254 of the ball seat retainer 154 to permit the inner surface 256 to be forced over the lower lip 254 of the ball seat retainer 154 when the groove 252 is being received between the top and lower lip 238, 254 of the ball seat retainer 154. The minimum diametrical distance of a perimeter defined by the inner surface 242 of the groove 252 approximately matches or is slightly greater than the diametrical distance of the perimeter defined by the outer surface 250 of the ball seat retainer 154. To operatively associate the boot 160 with the ball seat retainer 154, the ball seat retainer 154 is received within the cavity 240 of the boot 160 until the groove 252 of the boot 160 is received between the top and lower lip 238, 254 of the ball seat retainer 154. A split ring 258 that is adapted to be received within an outer surface 260 of the groove 252 of the boot 160 may be used to further enhance the operative association between the boot 160 and the ball seat retainer 154. Specifically, when the split ring 258 is received within outer surface 260 of the groove 252, the split ring 258 exerts a force that clamps the boot 160 onto the ball seat retainer 154. If desired, grease or other lubricating material may be received within the cavity 240 of the boot 160 to protect the metal portions of the ball seat retainer 154, the ball seat 152, and the ball stud member 150 from corrosion and other undesirable chemical or physical changes.

As depicted in FIGS. 8A and 8B, the first stud 34 of the ball stud member 150 can pivot and rotate to some extent relative to the housing 142 of the ball joint assembly 16 when the components of the ball joint assembly 16 are operatively associated with each other. The ability to pivot and rotate the first stud 34 relative to the housing 142 can be useful because it enables the first stud 34 to be selectively pivoted and rotated to align the first stud 34 in a desired orientation for facilitating its operation association with a spindle, knuckle, or other similar vehicle component. As shown in FIG. 8C, the first stud 34 of the ball stud member 150 is generally offset from the second stud 40 formed on the housing 142 of the ball joint assembly 16. As discussed herein, this offset provides an ability to adjust the camber angle, the caster angle, or both, by rotating the housing 142 relative to the control arm 10.

As previously mentioned, in some embodiments, when the ball joint assembly 16 is operatively associated with the control arm 10, a portion of the housing 142 will engage the lower swivel plate 32. Further, a perimeter of the housing 142 may be adapted to allow the ball joint assembly 16 to slide linearly along a portion of the length of the lower track 132 of the lower swivel plate 32 when of the housing 142 is engaged with the lower swivel plate 32. The perimeter of the housing 142 may be defined by one or more outer side surfaces 270. In the embodiment depicted in FIGS. 8A and 8B, the perimeter of the housing is defined by four outer side surfaces 270: two opposing generally arcuate surfaces separated by two opposing generally flat and parallel surfaces. In other embodiments, the perimeter of the housing 142 may be other shapes. For example, the perimeter of the housing 142 may be generally circular, may be generally hexagonal, may have one arcuate side opposed by a generally straight side surface and separated by opposing recessed side surfaces etc, or any other shape that will allow a portion of the housing 142 to be received between the tracks walls 134 of the lower swivel plate 32. It can be useful, however, to select a perimeter of the housing in which there are a pair of opposing outer side surfaces 270 whose surfaces match, and are in proximate contact with, a pair of opposing track walls 134 in the lower swivel plate 32 that run parallel to each other along the length of the lower slot 38 in the lower swivel plate 32. It can be useful because it generally permits the second stud 40 of the ball joint assembly 16 to be slid along a substantial length of the lower slot 38 in the lower swivel plate 32 while providing a maximum contact area between the pair of side surfaces of the housing 142 and the pair of tracks walls 134 of the lower swivel plate 32 for minimizing rotation of the ball joint assembly 16 relative to the lower swivel plate 32.

As generally shown in FIG. 4B, the perimeter of the housing 142 may be designed to permit the top surface 140 of the housing 142 to contact the lower track surface 136 of the lower swivel plate 32. Further, the perimeter of the housing 142 can be designed to allow opposing and substantially parallel side surfaces defining a portion of the perimeter of the outer side surface of the housing 142 to be positioned adjacent to and in contact with a pair of opposing and substantially parallel track walls 134 in the lower swivel plate 32. As such, the engagement of the opposing side surfaces defining a portion of the perimeter of the outer side surface of the housing 142 with the opposing track walls 134 in the lower swivel plate 32 prevents the ball joint assembly 16 from rotating relative to the swivel plates 30, 32 while allowing the ball joint assembly 16 to slide linearly along the length of the lower track 132 of the lower swivel plate 32.

Illustrative examples of how the present invention can be used to adjust the camber angle, the caster angle, or both on the suspension of a motor vehicle will now be discussed with reference to FIGS. 3, 4A, and 4B. As mentioned above, the rotational position of the ball joint assembly 16 relative to the control arm 10 as well as the linear position of the second stud 40 of the ball joint assembly 16 within the slot formed by the aligned upper and lower slots 36, 38 of the upper and lower swivel plates 30, 32 can be adjusted to affect the camber angle, the caster angle, or both. When the longitudinal axis of the formed slot is generally aligned with directional arrow "A" shown in FIG. 3, the camber angle can be adjusted by selectively moving the second stud 40 of the ball joint assembly 16 along the length of the formed slot. In another scenario, when the longitudinal axis of the formed slot is generally aligned with directional arrow "B" shown in FIG. 3, the caster angle can be adjusted by moving the second stud 40 of the ball joint assembly 16 within the formed slot without generally effecting the camber angle.

Because the longitudinal axes of the first stud 34 and second stud 40 are offset, additional camber adjustment, caster adjustment, or both can be made based on the relative locations of the studs 34, 40 to the control arm 10 when the ball joint assembly 16 is operatively associated with the control arm 10. For example, as shown in FIG. 4A, the studs 34, 40 of the ball joint assembly 16 are oriented such that the longitudinal axis of the first stud 34 is located to the left (as represented in FIG. 4A) of the longitudinal axis of the second stud 40. Disassociating the ball joint assembly 16 shown in FIG. 4A from the control arm 10, rotating the ball joint assembly 16 approximately 180 degrees, and re-associating the ball joint assembly 16 with the control arm 10 would place the longitudinal axis of the first stud 34 to the right of the longitudinal axis of the second stud 40, which would generally have an effect on both the caster and camber angles. However, a rotation of the ball joint assembly 16 may substantially impact only the caster angle or the camber angle. For example, if the first stud 34 of the ball joint assembly 16 is generally offset from the second stud 40 of the ball joint assembly 16 in the direction of arrow "A", then a 180 degree rotation of the ball joint assembly 16 would generally adjust the camber angle with little effect on the caster angle. Similarly, if the first stud 34 of the ball joint assembly 16 is generally offset from the second stud 40 of the ball joint assembly 16 in the direction of arrow "B", then a 180 degree rotation of the ball joint assembly 16 would generally adjust the caster angle with little effect on the camber angle.

The caster angle, the camber angle, or both can also be adjusted by changing the rotational orientation of the slot formed by the aligned upper and lower slots 36, 38 of the upper and lower swivel plates 30, 32 relative to the control arm 10. If the ball joint assembly 16 is operatively associated with the control arm 10 via the swivel plates 30, 32 when the swivel plates 30, 32 are rotated, rotating the swivel plates 30, 32 will cause the ball joint assembly 16 to be rotated relative to the control arm 10 in the directions generally shown by the directional arrows "D" in FIG. 4A. This rotation will generally change the position of the first stud 34 of the ball joint assembly 16 relative to the control arm 10 in the directions represented by directional arrow "A'" and "B'" in FIG. 3, which in turn, will generally change both the camber and caster angles. A rotation of the swivel plates 30, 32, however, may substantially impact only the caster angle or the camber angle. For example, if the first stud 34 of the ball joint assembly 16 is generally offset from the first stud 34 of the ball joint assembly 16 in the direction of arrow "A", then a 180 degree rotation of the swivel plates 30, 32 would generally adjust the camber angle with little effect on the caster angle. Similarly, if the first stud 34 of the ball joint assembly 16 is generally offset from the second stud 40 of the ball joint assembly 16 in the direction of arrow "B", then a 180 degree rotation of the swivel plates 30, 32 would generally adjust the caster angle with little effect on the camber angle.

Various methods of operatively associating the ball joint assembly 16 with the control arm 10 may be utilized. One method is illustrated in FIGS. 4A and 4B. As shown in FIGS. 4A and 4B, the ball joint assembly 16 may be operatively associated with the control arm 10 by inserting a washer 44 over the second stud 40 of the ball joint assembly 16 as it extends through the slot formed by the aligned upper and lower slots 36, 38 of the upper and lower swivel plates 30, 32 and threading a nut 42 onto the second stud 40. Tightening the nut 42 will clamp the ball joint assembly 16 onto the swivel plates 30, 32 thereby inhibiting movement of the second stud 40 within the slot.

When using a nut and washer to operatively associate the ball joint assembly with the control arm, various configurations of nuts and washers may be used other than the nut 42 and washer 44 depicted in FIG. 4A. For example, as shown in FIG. 12A, a flanged 280 nut having a generally annular wall 282 extending from one side can be used in combination with a washer 284 having a generally circular aperture 286 to operatively associate the ball joint assembly 16 with the control arm 10. The inner surface 288 of the annular wall 282 of the flanged nut 280 is threaded. The threads on the inner surface 288 are adapted to match the threads of the second stud 40, thereby allowing the flanged nut 280 to be threaded onto the second stud 40. The aperture 286 of the washer 284 is adapted to receive the second stud 40 and the wall 282 of the flanged nut 280. In operation, the washer 284 and the flanged nut 280 are received on the second stud 40. Further, the wall 282 of the flanged nut 280 is received within the aperture 286 of the washer 284. Since the inner surface 288 of the wall 282 of the flanged nut 280 is threaded and the wall 282 of the flanged nut 280 is received within the aperture 286 of the washer 284, the overall height "H" of the washer 284 in combination with the flanged nut 280 is reduced compared to the height of a washer 44 in combination with a flat nut 42 having the same amount of threading as the flanged nut 280, as illustrated in FIG. 12B. Therefore, using a nut and washer combination similar to that shown in FIG. 12A to operatively associate the ball joint assembly 16 with the control arm 10 reduces the required distance that the second stud 40 of the ball joint assembly 16 must extend above the control arm 10. A reduced stud height distance reduces the likelihood that the second stud 40 of the ball joint assembly 16 will contact the strut tower or other car structure when the motor vehicle wheel moves up and down. Further reductions in the distance that the second stud 40 of the first ball joint assembly 16 must extend above the control arm 10 can be achieved by utilizing finer threading on the second stud 40 and the nut.

Generally, a reduction in the overall height that the second stud 40 of the ball joint assembly 16 must extend above the control arm 10 means that a relatively shorter stud length can be utilized for the second stud 40. For example, if the ball joint assembly 16 utilizes a M14×2 stud for the second stud 40, the height of the second stud 40 can be reduced by 0.300 inches by replacing the M14×2 stud with a ⅝×32 stud and utilizing a flanged nut 280 and washer 284 combination to operatively associate the ball joint assembly 16 with the control arm 10. This example is merely illustrative of how the height of the second stud 40 of the ball joint assembly 16 may be reduced by utilizing a flanged nut 280 and washer 284 combination and is not intended to limit the second stud 40 of the ball joint assembly to the sizes used in the example. In other words, other sized studs may be utilized for the second stud 40 of the ball joint assembly 16.

Figure 13A:
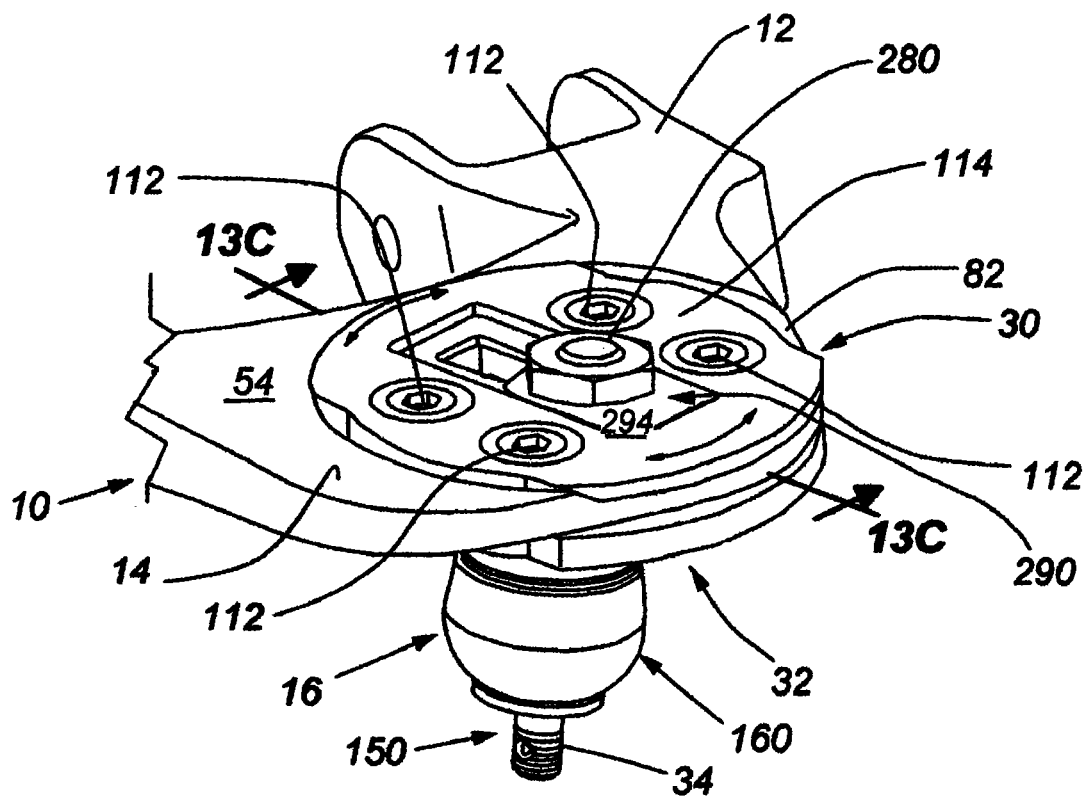
FIG. 13A is a top perspective view of a control arm and ball joint assembly.
Figure 14:
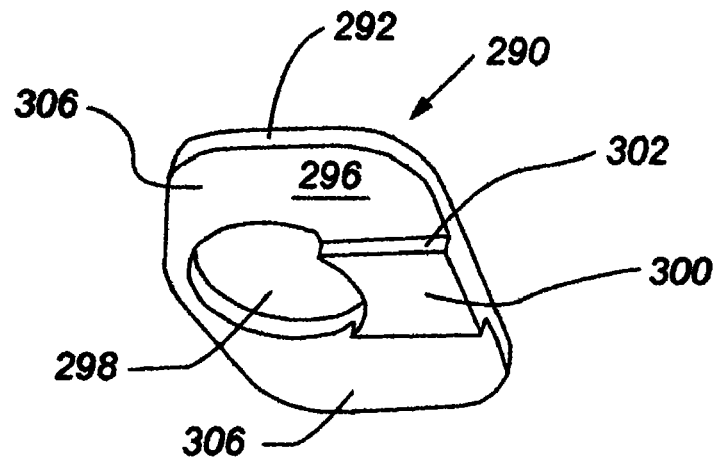
FIG. 14 is a bottom perspective view of a track washer.
Figure 13B:
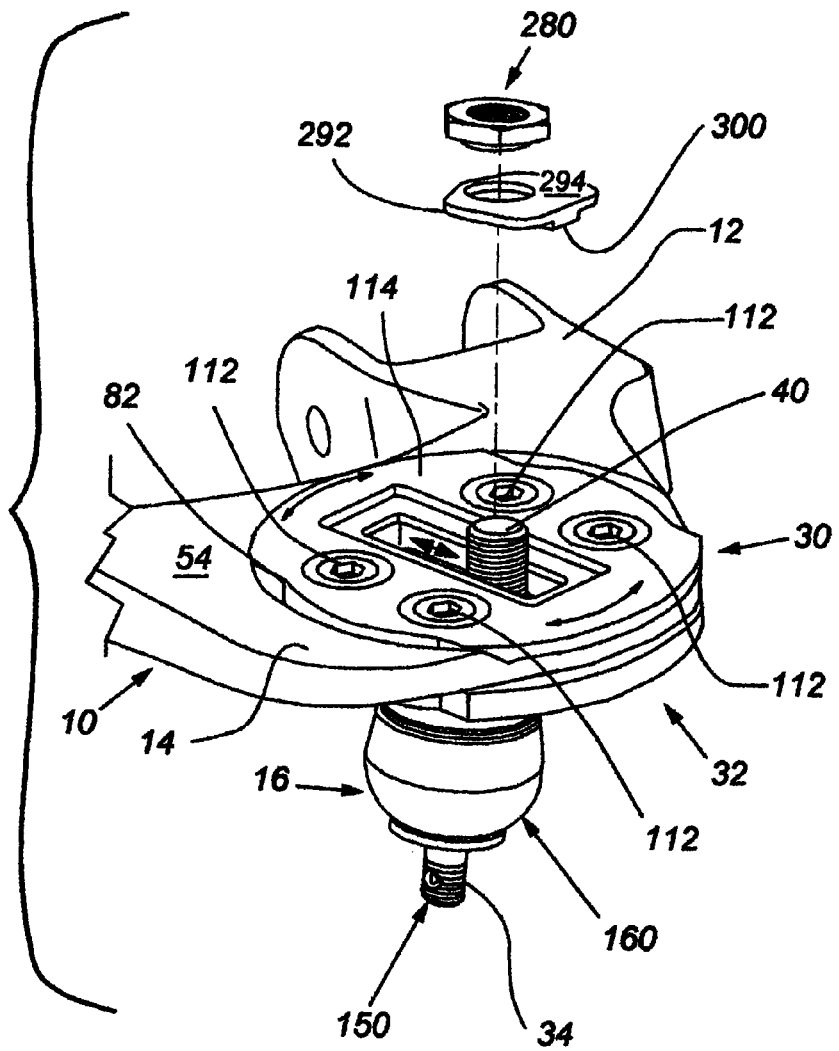
FIG. 13B is a top perspective view of the control arm and ball joint assembly with a nut and washer shown in exploded view.

As another example of a washer and nut combination that may be used to operatively associate the ball joint assembly 16 with the control arm 10, a track washer 290 may be used in combination with a flanged nut 280 as illustrated in FIGS. 13A and 13B. As depicted in FIG. 13A and FIGS. 13B and 14, the track washer 290 is a plate having a perimeter edge 292 defined by first and second generally flat edges parallel to each other and separated by a third flat generally edge and a fourth generally "V" shaped edge. In other embodiments, the perimeter edge 292 of the track washer 290 may be other shapes. For example, the perimeter edge 292 may be generally circular, may be generally hexagonal, may have one arcuate edge opposed by a generally straight edge and separated by opposing recessed edges, etc. It can be useful, however, to select a perimeter for the track washer 290 in which the perimeter edge has a pair of opposing surfaces that match, and are in proximate contact with, a pair of opposing track walls 118 in the upper swivel plate 30 that run parallel to each other along the length of the upper slot 36 in the upper swivel plate 30. It can be useful because it generally permits the second stud 40 of the ball joint assembly 16 to be slid along a substantial length of the upper slot 36 in the upper swivel plate 30 while providing a maximum contact area between the pair of opposing perimeter edge 292 surfaces for the of the track washer 290 and the pair of tracks walls 118 of the upper swivel plate 30 for minimizing rotation of the ball joint assembly 16 relative to the upper swivel plate 30.

The track washer 290 has a top surface 294 and a bottom surface 296 and includes an aperture 298 adapted to receive the second stud 40 of the ball joint assembly 16. The top surface 294 and bottom surface 296 of the track washer 290 are generally flat. A rail 300 extends from the bottom surface 296 of the track washer 290. The rail 300 may have a perimeter edge 302 that has two opposite sides that are adjacent to and contact (or are guided by) two opposing, generally parallel slot walls 310 defining of the upper slot 36 of the upper swivel plate 30 when the track washer 290 is inserted into the upper track 116 the upper swivel plate 30. The two opposite sides of the rail 300, when inserted between the slot walls 304 of the upper slot 36, help to inhibit the rotation of the ball joint assembly 16 relative to the upper swivel plate 30 when the nut threaded onto the second stud 40 of the ball joint assembly 16 is tightened. As shown in FIG. 14, the rail 300 may extend from the third edge of the perimeter edge 292 of the track washer 290 to a portion of the outer perimeter of the aperture 298. Areas of the bottom surface 296 of the track washer 290 on opposing sides of the rail 300 and aperture 298 define press surfaces 306. When the nut is tightened onto the second stud 40, which forces the track washer 290 down onto the upper side 114 of the upper swivel plate 30, the press surfaces 306 help distribute the forces exerted by the nut and the track washer 290 over a wider area of the upper swivel plate 30. This force distribution helps reduce the likelihood of damage to the upper swivel plate 30 when the nut is tightened onto the second stud 40. Although the track washer 290 is depicted as being used with a flanged nut 280, a flat nut could also be used with the track washer 290.

Figure 15:
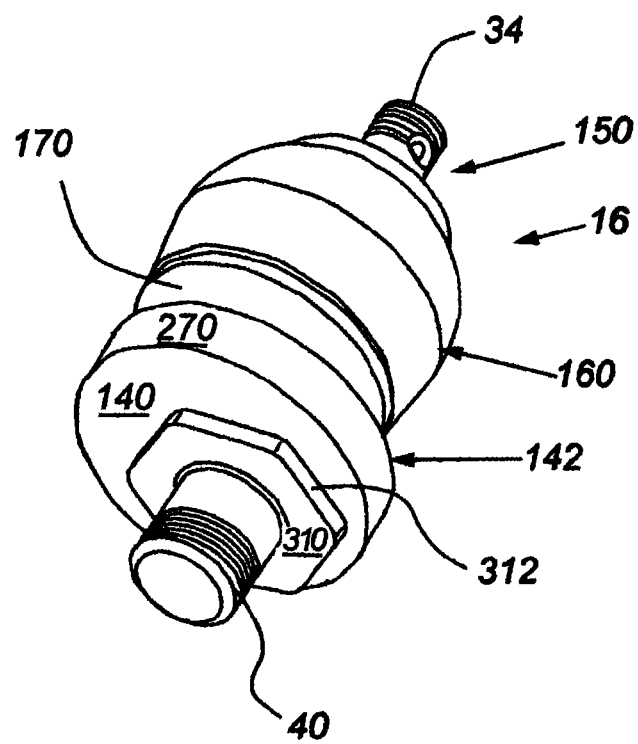
FIG. 15 is a perspective view of another embodiment of the ball joint assembly.

FIG. 15 shows a second embodiment of the ball joint assembly 16 for use with the control arm 10. The second embodiment of the ball joint assembly 16 is similar to the first embodiment described above. However, the housing 142 of the second embodiment of the ball joint assembly 16 differs from the housing 142 of the first embodiment of the ball joint assembly 16. Specifically, the housing 142 of the second embodiment has a raised surface 310 defined by a side wall 312 that extends from the top surface 140 of the housing 142. The side wall 312 is adapted for at least a portion of it to fit between the track walls 134 of the lower swivel plate 32 so that the raised surface 310 may contact the lower track surface 136 of the lower swivel plates 32.

As shown in FIG. 15, the housing 142 of the ball joint assembly 16 has a circular-shaped perimeter. In other embodiments, the perimeter of the housing 142 of the ball joint assembly 16 may be other shapes. For example, the perimeter of the housing 142 of the ball joint assembly 16 may be generally circular, may be generally hexagonal, may have one arcuate side surface opposed by a generally straight side surface and separated by opposing recessed side surfaces, etc. The top surface 140 of the housing 142 includes the raised surface 310 from which the second stud 40 extends. A perimeter of the side wall 312 defining the raised surface 310 is shown as hexagonal having three pairs of opposing, generally parallel sides. In other embodiments, the perimeter of the side wall 312 may be other shapes. For example, the perimeter of the side wall 312 may square, rectangular, octagonal, or any other shape that will permit at least a portion of the side wall 312 to fit between the track walls 134 of the lower swivel plate 32.

The second embodiment of the ball joint assembly 16 may be operatively associated with the control arm 10 in a similar manner as the first embodiment of the ball joint assembly 16. However, unlike the first embodiment, the outside 270 surfaces defining the perimeter of the housing 142 of the second embodiment of the ball joint assembly 16 do not engage the long track walls 134 of the lower swivel plate 32. Instead, two opposing side surfaces defining a portion of the perimeter of the side wall 312 engage the long, opposing track walls 134 defining the lower track 132 of the lower swivel plate 32. More particularly, the raised surface 310 of the second embodiment of the ball joint assembly 16 is inserted into the lower track 132 of the lower swivel plate 32 until the raised surface 310 is in contact with the lower track surface 136 of the lower swivel plate 32. Two opposing side surfaces defining a portion of the perimeter of the side wall 312 are positioned adjacent to and in contact with the long, opposing track walls 134 of the lower swivel plate 32. As such, the engagement of the two opposing side surfaces defining a portion of the perimeter of the side wall 312 of the ball joint assembly 16 with the long, opposing track walls 134 of the lower swivel plate 32 inhibits the ball joint assembly 16 from rotating relative to the swivel plates 30, 32 while allowing the ball joint assembly 16 to slide linearly along the length of the lower track 132 of the lower swivel plate 32.

Because the perimeter of the side wall 312 of the ball joint assembly 16 includes six side surfaces that can engage the long, opposing track walls 134 of the lower swivel plate 32, the ball joint assembly 16 can be positioned in six different rotational positions relative to the lower swivel plate 32. Other perimeters for the side wall 312, with a different number of side surfaces that can engage the long, opposing track walls 134 of the lower swivel plate 32, will result in different number of positions that the ball joint assembly 16 may be positioned relative to the lower swivel plate 32. For example, if the perimeter of the side wall 312 is octagonal with eight side surfaces that can engage the long, opposing track walls 134 defining the lower track 132 of the lower swivel plate 32, then the ball joint assembly 16 can be positioned in eight different rotational positions relative to the lower swivel plate 32.

Similar to the first embodiment of the ball joint assembly 16, the longitudinal axis of the second stud 40 of the second embodiment of the ball joint assembly 16 is offset from the longitudinal axis of the first stud 34 of the second embodiment of the ball joint assembly 16; in some embodiments, however, the longitudinal axes of the studs 34, 40 of the ball joint assembly 16 may generally coincide. The offset of the studs 34, 40 of the ball joint assembly 16 in combination with the ability to adjust the rotational position of the ball joint assembly 16 relative to the swivel plates 30, 32 provides additional ball joint assembly orientations in which to adjust the caster angle, the camber angle, or both. For example, the caster angle, the camber angle, or both, can be adjusted by changing the rotational orientation the ball joint assembly 16 relative to the slot formed by the aligned slots 36, 38 of the swivel plates 30, 32 without adjusting the rotational position of the swivel plates 30, 32. The second embodiment of the ball joint assembly 16 can be operatively associated with the control arm using any of the nut and washer configurations described above with reference to the first embodiment of the ball joint assembly 16.

Figure 16A:
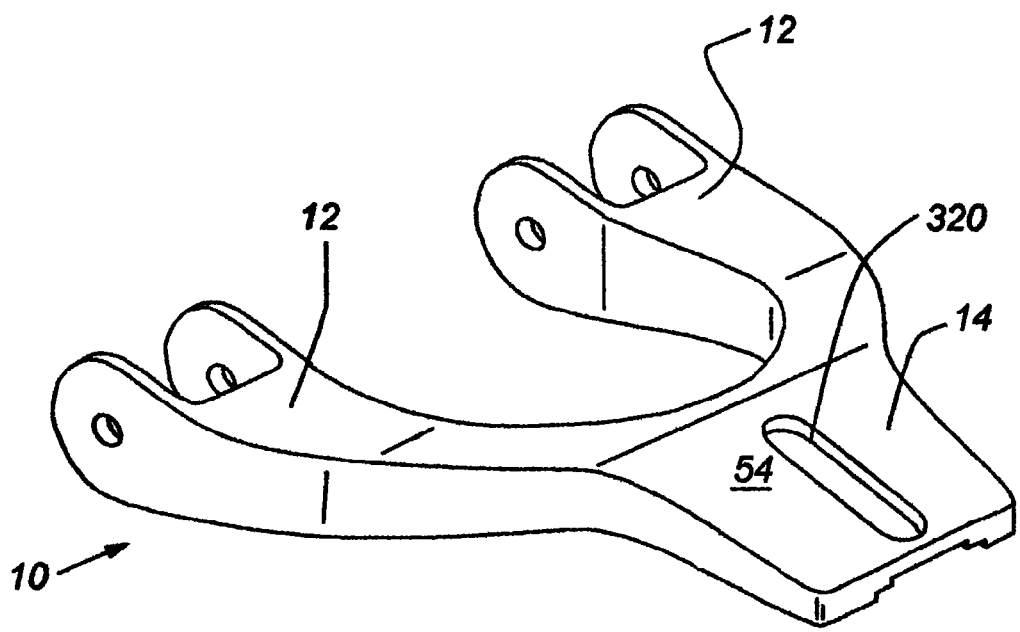
FIG. 16A is a top perspective view of another embodiment of the control arm.
Figure 16B:
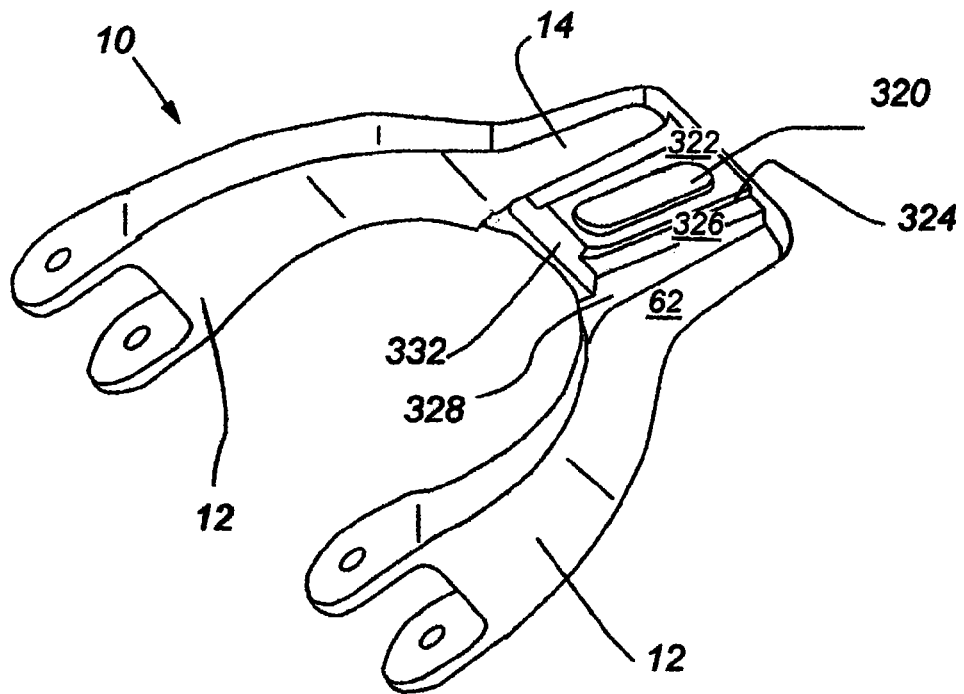
FIG. 16B is a bottom perspective view of the control arm.

An embodiment of a second embodiment of a control arm 10 is shown in FIGS. 16A and 16B. The second embodiment of the control arm 10 is shaped similarly to the first embodiment of the control arm 10 described above. As such, the second embodiment of the control arm 10 is generally Y-shaped and includes a pair of tower connection members 12 connected with the ball joint connection portion 14. However, unlike the first embodiment of the control arm 10, the ball joint connection portion 14 of the second embodiment of the control arm 10 does not include an aperture adapted to receive swivel plates. Instead, the ball joint connection portion 14 of the second embodiment of the control arm 10 includes a slot 320 adapted to receive the second stud 40 of the first or second embodiments of the ball joint assembly 16. As such, the ball joint assembly 16 is directly operatively associated with the control arm 10 as opposed to being operatively associated with the control arm 10 through swivel plates 30, 32.

With reference to FIG. 5B, the first embodiment of the control arm 10 has a lower bearing surface 60 on the bottom surface 62 of the control arm 10 surrounding the aperture 52. In contrast, the second embodiment of the control arm 10 has two potential bearing surfaces surrounding the slot 320 in the control arm 10. Specifically, as shown in FIG. 16B, the bottom surface 62 of the ball joint connection portion 14 of the second embodiment of the control arm 10 includes a first track surface 322 (i.e., a first potential bearing surface) defined in part by two second track walls 324 and a second track surface 326 (i.e., a second potential bearing surface) defined in part by two third track walls 328. As discussed in more detail below, when the second embodiment of the ball joint assembly 16 is operatively associated with the second embodiment of the control arm 10, the ball joint assembly 16 may either engage the two second or third track walls 324, 328 alone or engage the two second or third track walls 324, 328 in combination with a slider plate 340. As shown in FIG. 16B, the first track surface 322 is defined by a recessed area. In the depicted embodiment in FIG. 16B, the recessed area is generally rectangular. Specifically, along the perimeter of the recessed area is a first track wall 332 separating the two second track walls 324 that extend from the first track wall 332 to a first edge 334 of the ball joint connection portion 14 of the control arm 10. The first track wall 332 is relatively short compared to the second track walls 324 and the two second track walls 324 are generally parallel to each other. The second track walls 324 and the first track wall 332 of the control arm 10 are spaced outwardly from an outer perimeter of the slot 320 of the control arm 10. The recessed area between the outer perimeter of the slot 320, the first track wall 332, and the second track walls 324 defines the first track surface 322. Shapes for the first track surface 322 other than generally rectangular, for example generally square, may be utilized. The second track surface 326 is defined by the second track walls 324, the third track walls 328, and the first track wall 322. As discussed in more detail below, the raised surface 310 the housing 142 of the second embodiment of the ball joint assembly 16 may be adapted to contact either the first track surface 326, the second track surface, or both.

Figure 17A:
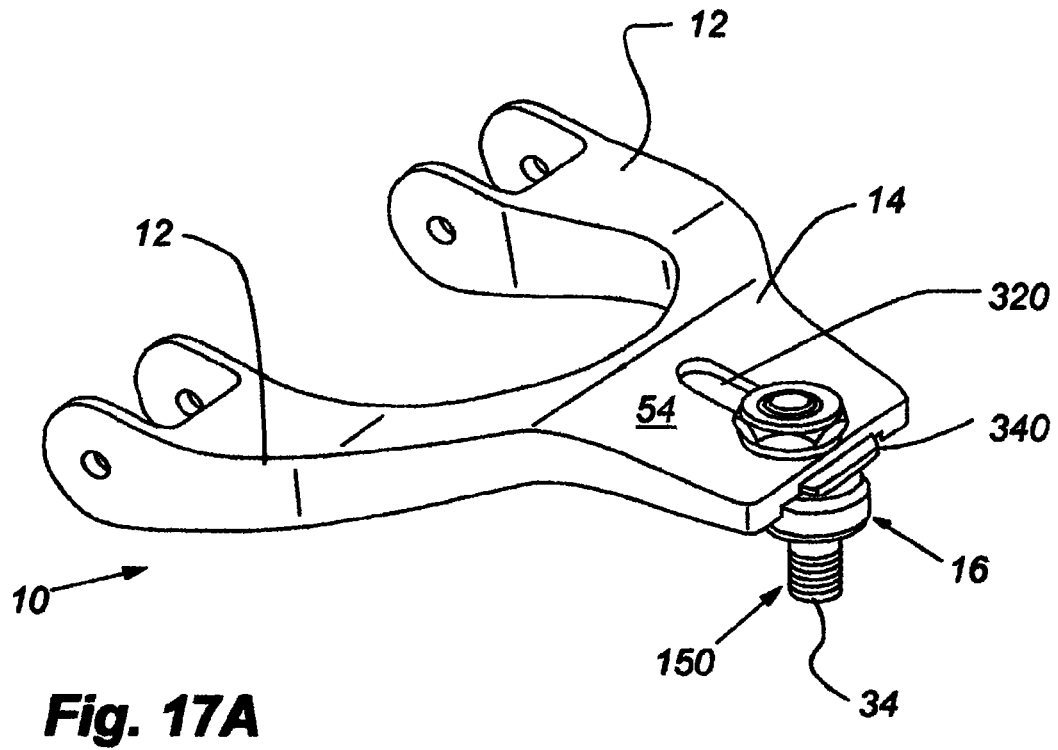
FIG. 17A is a top perspective view of an embodiment of the control arm operatively associated with an embodiment of the ball joint assembly.
Figure 17B:
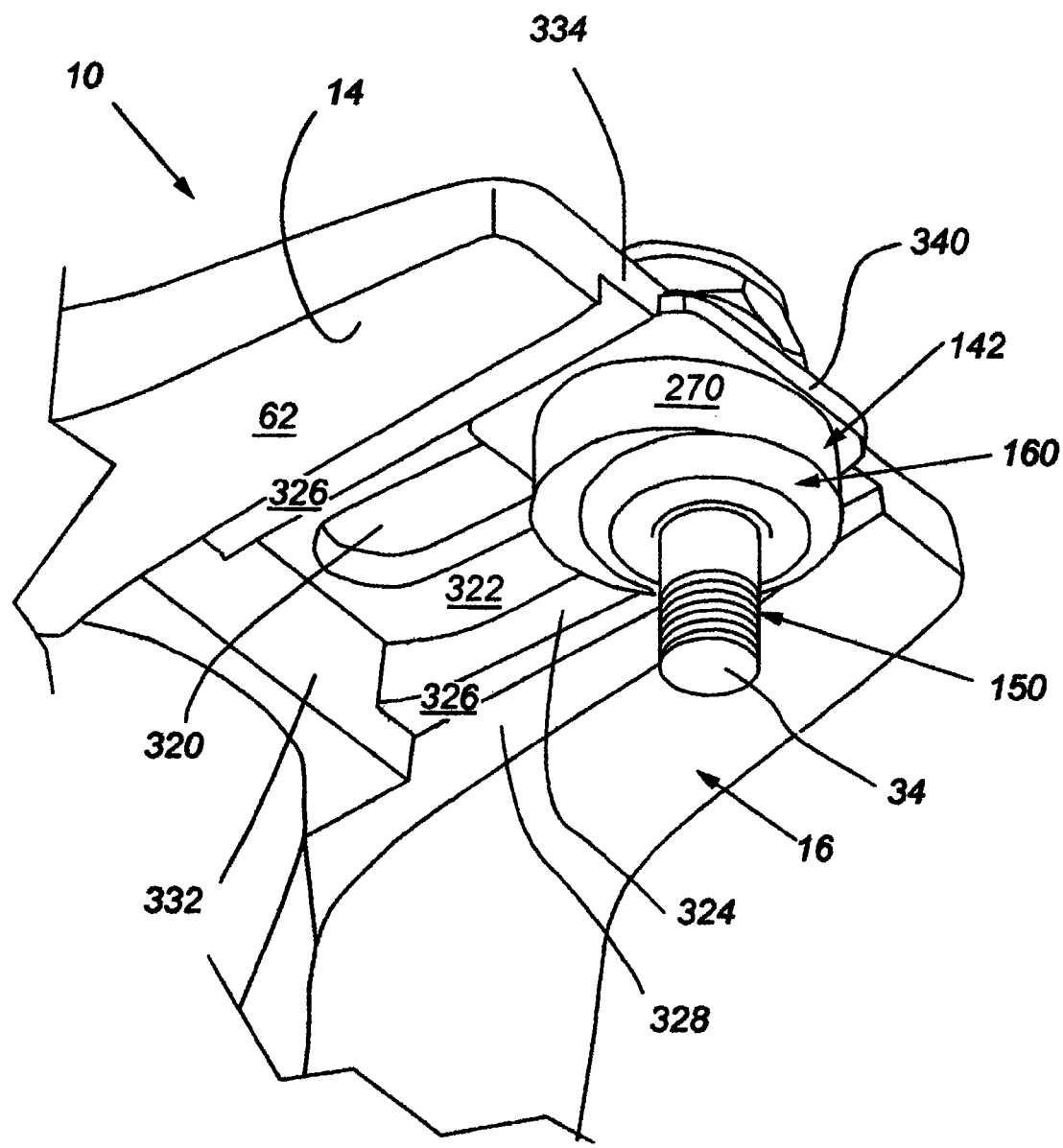
FIG. 17B is a bottom perspective view of the control arm operatively associated with the ball joint assembly.

FIGS. 17A and 17B illustrate an embodiment of the ball joint assembly 16 operatively associated with the second embodiment of the control arm 10. As shown in FIG. 17B, the ball joint assembly 16 is operatively associated with the second track walls of the second embodiment control arm through the slider plate 340. As shown in FIG. 17A, the second stud 40 of the ball joint assembly 16 extends upward through the slot 320 of the second embodiment of the control arm 10. A washer 342 and nut 344 threaded onto the second stud 40 of the ball joint assembly 16 holds the ball joint assembly 16 in a fixed linear position relative to the length of the slot 320 of the second embodiment of the control arm 10 when the nut 344 is tightened. As discussed above with reference to other embodiments, the nut 344 can be loosened so the linear position of the ball joint assembly 16 relative to the length of the slot 320 of the second embodiment of the control arm 10 can be adjusted. The camber angle is primarily adjusted by moving the ball joint assembly 16 along the length of the slot 320 of the second embodiment of the control arm 10.

As discussed above with reference to other embodiments, the longitudinal axes of the second stud 40 and first stud 34 of the ball joint assembly 16 are offset, which allows a user to make adjustments to the camber angle, caster angle, or both, by changing the rotational orientation of the first stud 34 of the ball joint assembly 16 relative to the control arm 10 without the need to change the rotational orientation of the slot 320 of the control arm 10 itself. Specifically, the threaded nut 344 and washer 342 are removed from the second stud 40 of the ball joint assembly 16. The second stud 40 of the ball joint assembly 16 is removed from the slot 320 of the control arm 10. The housing 142 of the ball joint assembly 16 is rotated relative to the control arm 10, thereby changing the relative rotational position of the first stud 34 relative to the control arm 10. The second stud 40 is inserted through the slot 320 of the control arm 20. The nut 344 and washer 342 are received onto the second stud 40, and the nut 344 is tightened.

Figure 18:
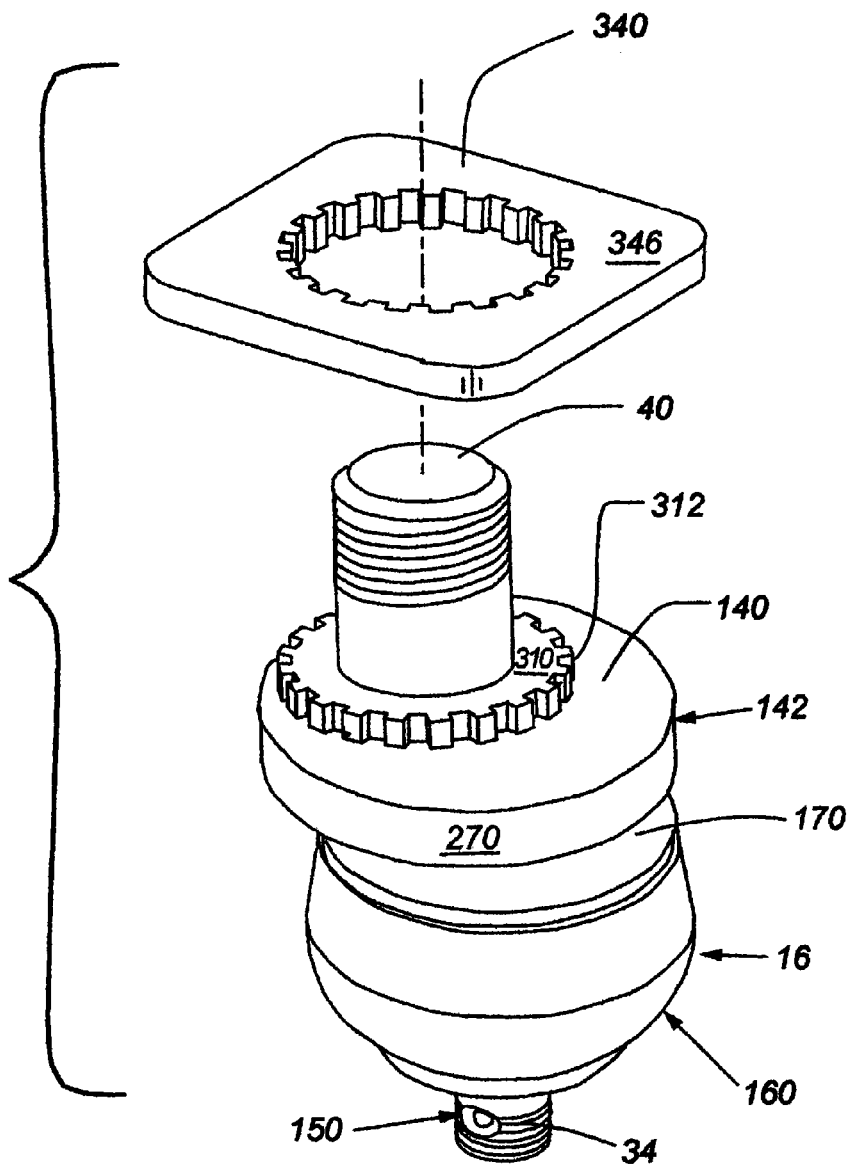
FIG. 18 is a perspective view of another embodiment of the ball joint assembly and a slider plate.

As shown in FIG. 18, the top surface 140 of the housing 142 of the second embodiment of the ball joint assembly 16 includes a raised surface 310 from which the second stud 40 extends. In the embodiment depicted in FIG. 18, the perimeter of side wall 312 defining the raised surface 310 of the ball joint assembly 16 is generally circular with a plurality of radially extending gear teeth. The gear teeth are adapted to be received in a correspondingly shaped aperture in the slider plate 340. The slider plate 340 has a perimeter defined by one or more edges. In the embodiment depicted in FIG. 18, the slider plate 340 has four edges that generally define a rectangle for the perimeter of the slider plate 340. The slider plate 340 could have more or less edges that would define other shapes for the perimeter of the slider plate 340 such as circular, rectangular, hexagonal, etc.

Generally, the slider plate 340 is adapted so that two opposing edges of the slider plate 340 are adjacent to and in contact with the second track walls 324 of the second embodiment of the control arm 10 when the slider plate 340 is received between the second track walls 324. In some embodiments, however, the slider plate 340 may be adapted so that two opposing edges of the slider plate 340 are adjacent to but not in contact with the second track walls 324 of the control arm 10 when the slider plate 340 is received between the second track walls 324. Further, in some embodiments, the slider plate 340 may be adapted so that two opposing edges of the slider plate 340 are adjacent to the third track walls 328 of the second embodiment of the control arm 10 when the slider plate 340 is received between the third track walls 328; in such embodiments, the two opposing edges of the slider plate 340 may or may not be in contact with the third track walls 328. An advantage, however, of having the two opposing edges of the slider plate 340 in contact with either the second or third track walls 324, 328 of the second embodiment of the control arm 10 is the contact between the opposing edges of the slider plate 340 and the track walls 324, 328 of the control arm 10 will substantially prevent rotation of the slider plate 340 relative to the control arm 10 when the slider plate 340 is operatively associated with the control arm 10.

To operatively associate the ball joint assembly 16 with the second embodiment of the control arm 10, the slider plate 340 is received between the second track walls 324 of the control arm 10 until the upper surface of the slider plate 346 is in contact with the first track surface 322. Generally, when the slider plate 340 is received between the second track walls 324 of the second embodiment of the control arm 10, two opposing edges of the slider plate 340 will be adjacent to the second track walls 324 of the control arm 10. The second stud 40 of the ball joint assembly 16 is then received through the aperture of the slider plate 340 and through the slot 320 of the second embodiment of the control arm 10 until the side wall 312 of the ball joint assembly 16 is received within the aperture in the slider plate 340. A portion of the raised surface 310 of the ball joint assembly may also be in contact with the first track surface 322 of the second embodiment of the control arm 10. The washer is then received onto the second stud 40 of the ball joint assembly 16 and the nut is received onto the second stud 40. The nut is tightened, thereby pressing the washer against a top of the second embodiment of the control arm 10. The engagement of the gear teeth defining the side wall 312 of the ball joint assembly 16 with the matching aperture of the slider plate 340 prevents the ball joint assembly 16 from rotating relative to the slider plate 340. Further, the engagement of the two opposing edges of the slider plate 340 with the second track walls 324 of the control arm 10 prevents the ball joint assembly 16 and the slider plate 340 from rotating relative to the second embodiment of the control arm 10, while also allowing the ball joint assembly 16 and slider plate 340 to slide linearly along the length of the first track surface 322 when the nut received on the second stud 40 of the ball joint assembly is sufficiently loosened.

Because the perimeter of the side wall 312 defining the raised surface 310 of the ball joint assembly 16 includes a plurality of gear teeth that can engage corresponding indentations on the perimeter defining the aperture of the slider plate 340, the ball joint assembly can be positioned in a plurality of rotational positions relative to the slider plate 340 and the second embodiment of the control arm 10. The longitudinal axis of the second stud 40 of the ball joint assembly 16 is offset from the longitudinal axis of the first stud 34 of the second embodiment of the ball joint assembly 16. As such, the offset studs provide an ability to adjust the rotational position of the first stud 34 of the ball joint assembly 16 relative to the slider plate 340 and the second control arm 10. By adjusting the rotational position of the first stud 34 of the ball joint assembly 16, the caster and/or camber angles can be adjusted.

The perimeter of the side wall 312 defining the raised surface 310 of the ball joint assembly 16 depicted in FIG. 18 includes twenty gear teeth. Therefore, the engagement of the perimeter of the side wall 312 of the ball joint assembly 16 with the matching aperture in the slider plate 340 allows the ball joint assembly 16 to be set in twenty rotational positions relative to the slider plate 340 and the control arm 10. Other embodiments of the ball joint assembly 16 and slider plate 340 can include different quantities of gear teeth to provide more or less rotational positional adjustments of the ball joint assembly 16. Further, the slider plate 340 can be rotated relative to the second embodiment of the control arm 10 to allow a user to change the rotational position of the ball joint assembly 16 relative to the control arm 10. For example, for the slider plate 340 depicted in FIG. 18 with four edges, the slider plate 340 could be rotated to four rotational positions relative to the second control arm 10. The ball joint assembly 16 shown in FIG. 18 can be operatively associated with the second embodiment of the control arm 10 with any of the nut and washer configurations described above with reference to operatively associating the first embodiment of the ball joint assembly 16 with the first embodiment of the control arm 10.

Figure 19:
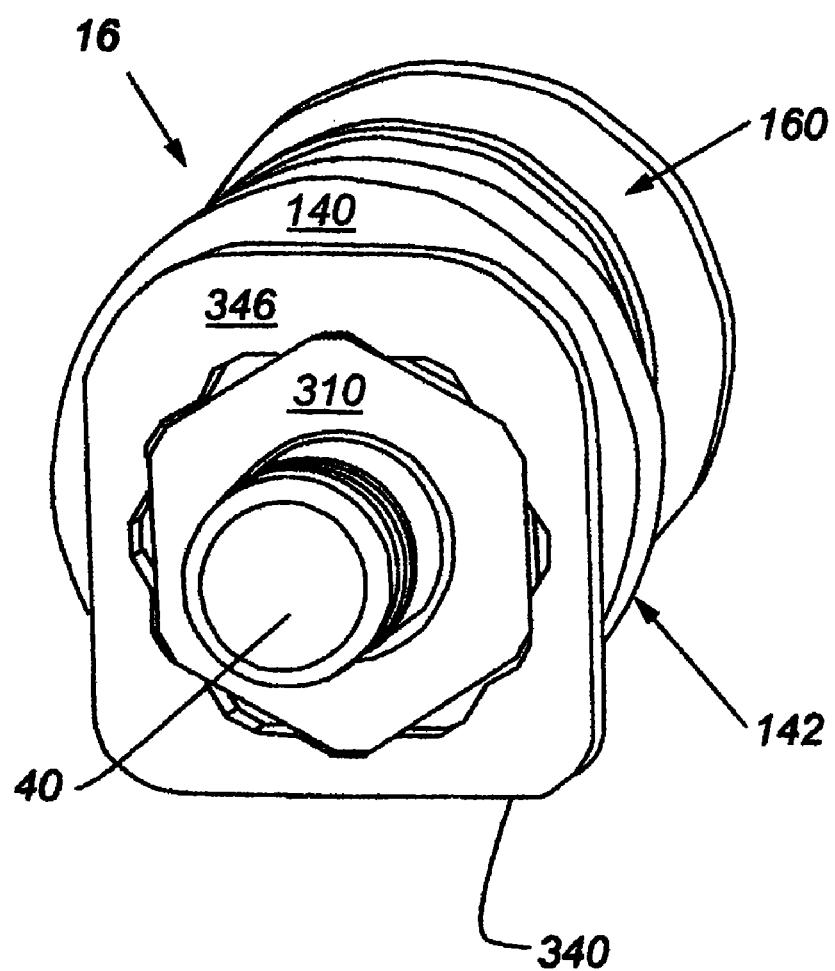
FIG. 19 is a top perspective view of the operative association of a slider plate with another embodiment of the ball joint assembly.

FIG. 19 shows another embodiment of the ball joint assembly 16 and slider plate 340 adapted to be operatively associated with the second embodiment of the control arm 10. This alternative embodiment of the ball joint assembly 16 is similar to the embodiment of the ball joint assembly 16 with the geared raised surface 310 except the perimeter of the side wall 312 defining the raised surface 310 is generally hexagonal rather than geared. This hexagonal perimeter is adapted to be received within the aperture in the slider plate 340. The hexagonal perimeter is defined by six relatively long side surfaces separated by six relatively short side surfaces. Although depicted in FIG. 19 as being separated by short side surfaces, the six long side surfaces could be separated by six radius curves. The connection of two long side surfaces with one short side surface defines a corner region on the hexagonal perimeter of the of the ball joint assembly. As such, the second side wall defining the raised surface of the embodiment of the ball joint assembly shown in FIG. 19 has six corner regions.

As shown in FIG. 19, the perimeter edge of the aperture of the slider plate 340 follows has a plurality of recesses adapted to match the corner regions of the hexagonal perimeter of the ball joint assembly. In the embodiment depicted in FIG. 19, the slider plate 340 includes twelve such recesses. Therefore, the engagement of the corner regions of the hexagonal perimeter of the ball joint assembly 16 with the recesses of the aperture in the slider plate 340 allows the ball joint assembly to be set in twelve different rotational positions relative to the slider plate 340 and the second embodiment of the control arm 10.

It is to be appreciated that other embodiments of the ball joint assembly 16 and slider plate 340 can include different quantities of corner regions for the perimeter of the side wall 312 defining the raised surface 310 of the ball joint assembly 16 and corresponding recesses for the aperture in the slider plate 340 to provide more or less rotational positional adjustments of the ball joint assembly 16. For example, the perimeter of the side wall 312 defining the raised surface 310 of the ball joint assembly 16 could be generally square, octagonal, or any other shape. The ball joint assembly 16 shown in FIG. 19 can be operatively associated with the second embodiment of the control arm 10 with any of the nut and washer configurations described above with reference to operatively associating the first embodiment of the ball joint assembly 16 with the first embodiment of the control arm 10.

As mentioned above, the ball joint assembly 16 can also be configured to directly engage the second track walls 324 of the second embodiment of the control arm 10 without utilizing the slider plate 340. For example, FIGS. 20A, 20B, and 21 show an embodiment of the ball joint assembly 16 having a hexagonal perimeter for the side wall 312 adapted to engage the second track walls 324 of the second embodiment of the control arm 10. More particularly, when the ball joint assembly 16 is operatively associated with the control arm 10, the hexagonal perimeter of the side wall 312 is received between the second track walls 324 of the second embodiment of the control arm 10 until the raised surface 310 is in contact with the first track surface 322. A washer 342 and nut 344 are received onto the second stud 40 of the ball joint assembly 16. The nut 344 is tightened, thereby pressing the washer 342 onto the top surface of the second embodiment of the control arm 10 and operatively associating the ball joint assembly 16 with the control arm 10.

In addition, the perimeter of the side wall 312 of the ball joint assembly 16 may be adapted so that two opposing side surfaces of the side wall 312 are positioned adjacent to and in contact with the second track walls 324 of the second embodiment of the control arm 10. As such, the engagement of the two opposing side surfaces of the side wall 312 of the ball joint assembly 16 with the second track walls 324 of the second embodiment of the control arm 10 prevents the ball joint assembly 16 from rotating relative to the control arm 10 while also allowing the ball joint assembly 16 to slide linearly along the length of the slot 320 of the control arm 10. Because the side wall 312 of the ball joint assembly 16 includes six side surfaces that can engage the second track walls 324 of the second embodiment of the control arm 10, the ball joint assembly 16 can be positioned in six different rotational positions relative to the control arm 10. Other embodiments of the ball joint assembly 16 can include different quantities of side surfaces for the side wall 312 of the ball joint assembly 16 to provide more or less rotational positional adjustments of the ball joint assembly 16 relative to the second embodiment of the control arm 10. For example, the perimeter of the side wall 312 of the ball joint assembly 16 could be generally square, octagonal, or any other shape that would allow at least a portion of the perimeter of the side wall 312 to be received between the second track walls 324 of the second embodiment of the control arm 10.

Some embodiments of the ball joint assembly 16 may be adapted to have two opposing side surfaces for the side wall 312 of the ball joint assembly 16 that are adjacent to the second track walls 324 of the second embodiment of the control arm 10 but not in contact with the second track walls 324 when the ball joint assembly 16 is directly operatively associated with the control arm 10. Other embodiments of the ball joint assembly 16 may be adapted to have two opposing side surfaces for side wall 312 of the ball joint assembly 16 that are adjacent to the third track walls 328 of the control arm 10 when the ball joint assembly 16 is directly operatively associated with the second embodiment of the control arm 10; in such embodiments, the two opposing side surfaces of the side wall 312 of the ball joint assembly 16 may or may not be in contact with the third track walls 328. An advantage, however, of having two opposing side surfaces of the side wall 312 of the ball joint assembly 16 in contact with either the second or third track walls 324, 328 of the second embodiment of the control arm 10 is the contact between the opposing side surfaces and the second or third track walls 324, 328 will substantially prevent rotation of the ball joint assembly 16 relative to the control arm 10 when the ball joint assembly 16 is operatively associated with the control arm 10.

As shown in FIG. 20A, the control arm, the ball joint assembly, or both, may have indicator marks 348. The indicator marks 348 may be used to indicate a value for the camber angle, the caster angle, or both. For example, the indicator marks 348 may indicate that the camber angle or the caster angle is at a minimum or maximum value based on the location of the studs 34, 40 of the ball joint assembly 16 relative to the control arm 10. The indicator marks 348 may also indicate that the camber angle or the caster angle is at a value between the maximum and minimum values for these angles. Indicator marks 348 could also be used with the control arm 10, the ball joint assembly 16, and the swivel plates 30, 32 to indicate a value for the camber angle, the caster angle, or both. The indicator marks 348 could also be used to help a user align the swivel plates 30, 32 or the ball joint assembly 16 to desired positions relative to the control arm 10.

Although the second embodiment of the control arm 10 has been illustrated and described as being operatively associated with various embodiments of a ball joint assembly with a raised surface, embodiments of the ball joint assembly without a raised surface, with minor modifications, could be operatively associated with the second embodiment of the control arm 10. For example, the outer side surfaces 270 defining the perimeter of the housing 142 of the first embodiment of the ball joint assembly 16 could be adapted to be adjacent to and in contact with the second or third track walls 324, 328 of the second embodiment of the control arm 10. In other words, the outer side surfaces 270 defining of the base of the housing of the first embodiment of the ball joint assembly 16 could be serve a similar function as the side surfaces defining the perimeter of the side wall 312 of the second embodiment of the ball joint assembly 16.

Although the present invention is described and depicted herein with reference motor vehicle suspension systems, embodiments of the present invention can be utilized with other types of suspension systems that require camber and/or caster angle adjustments for wheel alignment. Further, although various representative embodiments of this invention have been described above with a certain degree of particularity, those skilled in the art could make numerous alterations to the disclosed embodiments without departing from the spirit or scope of the inventive subject matter set forth in the specification and claims.

All directional references (e.g., upper, lower, upward, downward, left, right, leftward, rightward, top, bottom, above, below, vertical, horizontal, clockwise, and counter-clockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A control arm for a motor vehicle suspension system comprising:
    a main control arm body defined by a first connection member and a second connection member extending from a ball joint connection portion; wherein:
        the ball joint connection portion includes a slot; and
        a first side of the ball joint connection portion includes a first track surface encompassing the slot.

2. The control arm of claim 1, wherein the first side of the ball joint connection portion includes a pair of first track walls adjacent to the first track surface and generally parallel to a length of the slot.

3. The control arm of claim 2, wherein:
    the first side of the ball joint connection portion includes a pair of second track walls generally parallel to the length of the slot and at least one second track surface between the first track surface and at least one of the pair of second track walls.

4. The control arm of claim 2, wherein, the pair of first track walls are operative to receive a slider plate therebetween.

5. The control arm of claim 2, wherein the pair of first track walls are operative to receive a portion of a housing of a ball joint assembly therebetween.

6. The control arm of claim 5, wherein the portion of the housing of the ball joint assembly is a wall extending from an outer surface of the housing.

7. The control arm of claim 5, wherein the portion of the housing is an outer surface defining a base of the housing.

8. The control arm of claim 1, wherein the slot is operative to receive a stud of a ball joint assembly.

9. A motor vehicle suspension component kit comprising:
    a ball joint assembly comprising:
        a housing with an integral first stud extending therefrom;
        a ball seat operatively associated with the housing;
        a ball joint member having a first end portion operatively associated with the ball seat and a second end portion defined by a second stud;
    a control arm comprising:
        a main control arm body defined by a first connection member and a second connection member extending from a ball joint connection portion; wherein:
            the ball joint, connection portion includes a slot;
            a first side of the ball joint connection portion includes a plurality of walls defining a first track surface encompassing the slot; and
            when the ball joint assembly is operatively associated with the control arm, the housing is engaged with at least two of the plurality of walls and the first stud extends through the slot.

10. A control arm having an adjustable ball joint assembly comprising:
    an aperture formed in the control arm;
    a first wall and second wall formed in the control arm, the first and second wall each having a length extending generally parallel to each other with the aperture therebetween;
    a slider received between the first and second wall and selectively movable along the lengths of the first and second wall; and
    a ball joint assembly operatively associated with the slider.

11. The control arm of claim 10, wherein the ball joint assembly includes a first stud extending from the ball joint assembly through the aperture.

12. The control arm of claim 11, wherein the ball joint assembly includes a second stud extending in a direction from the ball joint assembly generally opposite the first stud.

13. The control arm of claim 12, wherein the second stud is pivotable and rotatable relative to the ball joint assembly.

14. The control arm of claim 12, wherein the second stud is offset from the first stud.

* * * * *